US012647874B2

(12) United States Patent
Takahashi et al.

(10) Patent No.: US 12,647,874 B2
(45) Date of Patent: Jun. 2, 2026

(54) TERMINAL, BASE STATION, AND COMMUNICATION METHOD

(71) Applicant: NTT DOCOMO, INC., Tokyo (JP)

(72) Inventors: Hideaki Takahashi, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 403 days.

(21) Appl. No.: 18/000,741

(22) PCT Filed: Jul. 7, 2021

(86) PCT No.: PCT/JP2021/025682
§ 371 (c)(1),
(2) Date: Dec. 5, 2022

(87) PCT Pub. No.: WO2022/044558
PCT Pub. Date: Mar. 3, 2022

(65) Prior Publication Data
US 2023/0247529 A1 Aug. 3, 2023

(30) Foreign Application Priority Data

Aug. 28, 2020 (JP) ................................. 2020-145095

(51) Int. Cl.
*H04W 64/00* (2009.01)
*H04W 48/08* (2009.01)

(52) U.S. Cl.
CPC ........... *H04W 48/08* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 2011/0255486 A1* | 10/2011 | Luo | ....................... | H04W 48/12 |
| | | | | 370/329 |
| 2022/0141887 A1* | 5/2022 | Ahn | ....................... | H04L 5/0091 |
| | | | | 370/329 |
| 2023/0142130 A1* | 5/2023 | Kim | ....................... | H04W 16/28 |
| | | | | 370/329 |

(Continued)

FOREIGN PATENT DOCUMENTS

| | | |
|---|---|---|
| CN | 116195302 A | 5/2023 |
| EP | 4199601 A1 | 6/2023 |

OTHER PUBLICATIONS

International Search Report issued in Application No. PCT/JP2021/025682 mailed on Sep. 14, 2021 (3 pages).

(Continued)

*Primary Examiner* — Suhail Khan
(74) *Attorney, Agent, or Firm* — Osha Bergman Watanabe & Burton LLP

(57) ABSTRACT
A terminal includes a receiving unit that receives first system information from a base station; and a control unit that acquires, from the first system information, a first list, a second list, and a third list, the first list scheduling second system information other than the first system information, and determines, based on the second list and the third list, a start position of a window for acquiring the second system information, wherein the receiving unit receives, from the base station, the second system information in the window.

4 Claims, 19 Drawing Sheets

SystemInformationBlockType1 field descriptions schedulingInfoList
Indicates scheduling information of SI messages. If *schedulingInfoList-v12xy* is present, the number of entries shall be equal to the one in *schedulingInfoList* (without suffix). The *schedulingInfoList-v12xy* provides additional SIBs mapped into the SI message scheduled via *schedulingInfoList* (without suffix). The first entry in *schedulingInfoList-v12xy* is applied to the first entry in *schedulingInfoList* (without suffix). The second entry in *schedulingInfoList-v12x* is applied to the second entry in *schedulingInfoList* (without suffix), and so on.

schedulingInfoList2
Indicates additional scheduling information of SI messages. If the *schedulingInfoList2* is present, the total number of entries of this field plus *schedulingInfoList* (without suffix) shall not exceed the value of *maxSI-Message*.

sib-MappingInfo
List of the SIBs mapped to this *SystemInformation* message. There is no mapping information of SIB2; it is always present in the first *SystemInformation* message listed in the *schedulingInfoList* list. The *sib-MappingInfo* (without suffix) shall include at least one entry of the *SIB-Type*, except for the first *SystemInformation* message listed in the *schedulingInfoList* list. The *sib-MappingInfo-v12xy* and *sib-MappingInfo-r12* (if present) shall not included the same value of *SIB-Type* as present in *sib-MappingInfo* (without suffix).

(56) References Cited

U.S. PATENT DOCUMENTS

| | | | |
|---|---|---|---|
| 2023/0171791 A1* | 6/2023 | Fujishiro | H04W 76/40 |
| | | | 370/312 |
| 2023/0239856 A1 | 7/2023 | Takahashi et al. | |

OTHER PUBLICATIONS

Written Opinion issued in Application No. PCT/JP2021/025682 mailed on Sep. 14, 2021 (4 pages).

NTT Docomo, Inc., "Problem on SI scheduling via an extended field", 3GPP TSG-RAN WG2 #111 electronic, R2-2008083, Online, Aug. 17-28, 2020 (6 pages).

3GPP TS 36.331 V15.10.0, "3rd Generation Partnership Project; Technical Specification Group Radio Access Network; Evolved Universal Terrestrial Radio Access (E-UTRA); Radio Resource Control (RRC); Protocol specification (Release 15)" Jul. 2020 (965 pages).

3GPP TS 38.331 V16.1.0, "3rd Generation Partnership Project; Technical Specification Group Radio Access Network; NR; Radio Resource Control (RRC) protocol specification (Release 16)" Jul. 2020 (906 pages).

3GPP TS 36.331 V16.1.1; "LTE; Evolved Universal Terrestrial' Radio Access (E-UTRA); Radio Resource Control (RRC); Protocol specification (3GPP TS 36.331 version 16.1.1 Release 16)", Jul. 2020 (1,083 pages).

Extended European Search Report issued in European Application No. 21860988.1, mailed Jul. 25, 2024 (11 pages).

Office Action issued in Chinese Patent Application No. 202180059212. 5, issued Apr. 25, 2025 (22 pages).

\* cited by examiner

SystemInformationBlockType1 message

```
-- ASN1START
[...]
SystemInformationBlockType1-v1540-IEs ::=   SEQUENCE {
    si-posOffset-r15              ENUMERATED {true}   OPTIONAL, -- Need ON
    nonCriticalExtension          SystemInformationBlockType1-v15xy-IEs      OPTIONAL SystemInformationBlockType1-v15xy-IEs ::=   SEQUENCE {
    schedulingInfoList-v15xy      SchedulingInfoList-v15xy OPTIONAL, -- Need OR
    nonCriticalExtension          SEQUENCE {}             OPTIONAL
}

SchedulingInfoList-v15xy ::= SEQUENCE (SIZE (1..maxSI-Message)) OF SchedulingInfo-v15xy SchedulingInfo-v15xy ::= SEQUENCE {
    si-Periodicity-r15            ENUMERATED {rf8, rf16, rf32, rf64, rf128, rf256, rf512},
    sib-MappingInfo-v15xy         SIB-MappingInfo-v15xy
}

SIB-MappingInfo-v15xy ::= SEQUENCE (SIZE (0..maxSIB-1)) OF SIB-Type-v15xy

SIB-Type-v15xy ::=
                    ENUMERATED {
                        sibType19-v1250, sibType20-v1310, sibType21-v1430,
                        sibType24-v1530, sibType25-v1530, sibType26-v1530,
                        spare2, spare1, ...}

[...]
-- ASN1STOP
```

FIG.5

| *SystemInformationBlockType1* field descriptions |
|---|
| *schedulingInfoList* |
| Indicates scheduling information of SI messages from SIB3 to SIB18. E-UTRAN shall not schedule SIB19 and onwards via this field. |
| *schedulingInfoList-v15xy* |
| Indicates scheduling information of SI messages from SIB19 and onwards. This field shall not schedule the same SIBs as in *schedulingInfoList* (without suffix). |

FIG.7

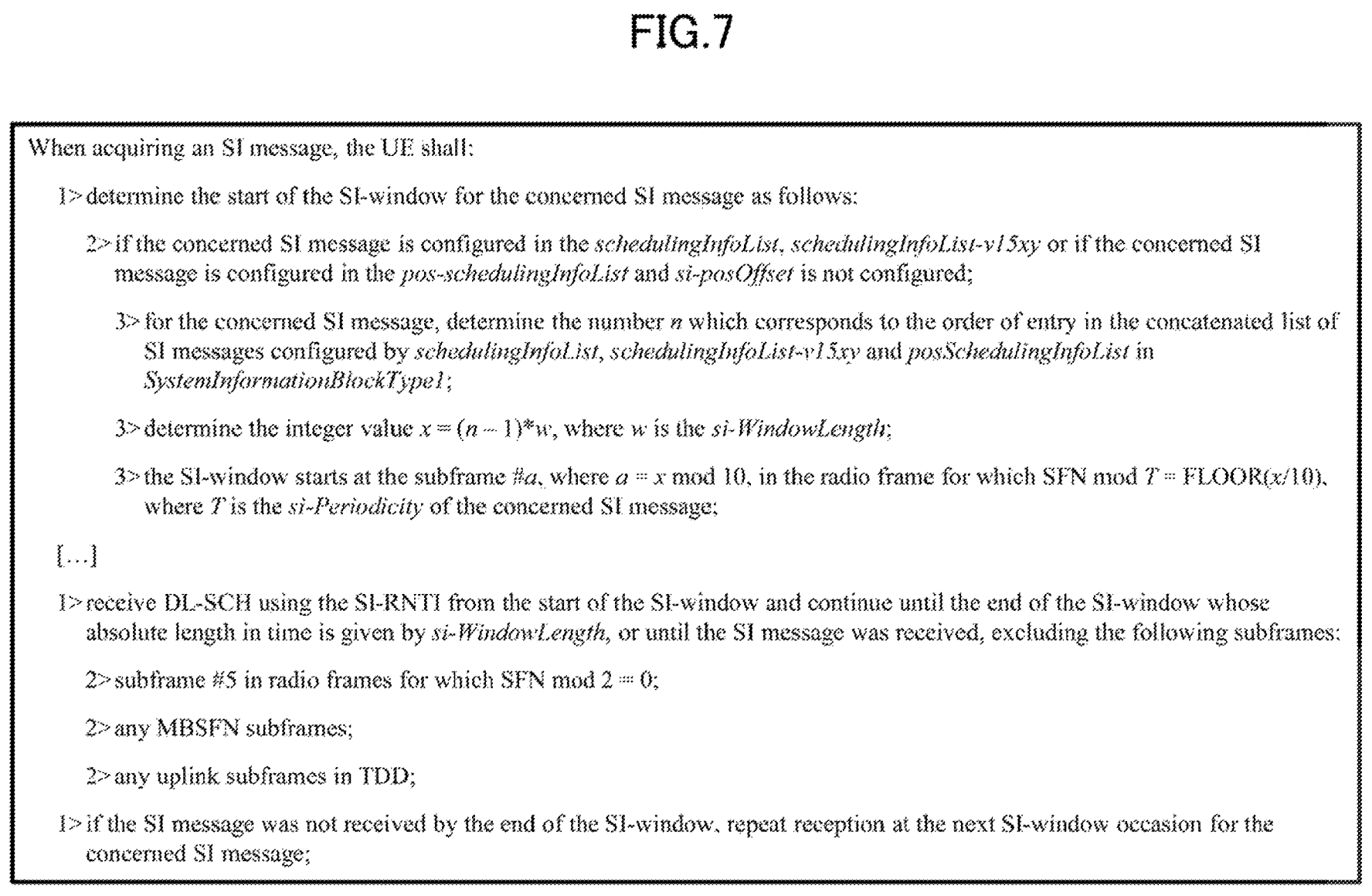

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured;

3> for the concerned SI message, determine the number *n* which corresponds to the order of entry in the concatenated list of SI messages configured by *schedulingInfoList*, *schedulingInfoList-v15xy* and *posSchedulingInfoList* in *SystemInformationBlockType1*;

3> determine the integer value $x = (n-1)*w$, where $w$ is the *si-WindowLength*;

3> the SI-window starts at the subframe #*a*, where $a = x \bmod 10$, in the radio frame for which SFN mod $T = \text{FLOOR}(x/10)$, where $T$ is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

FIG.8

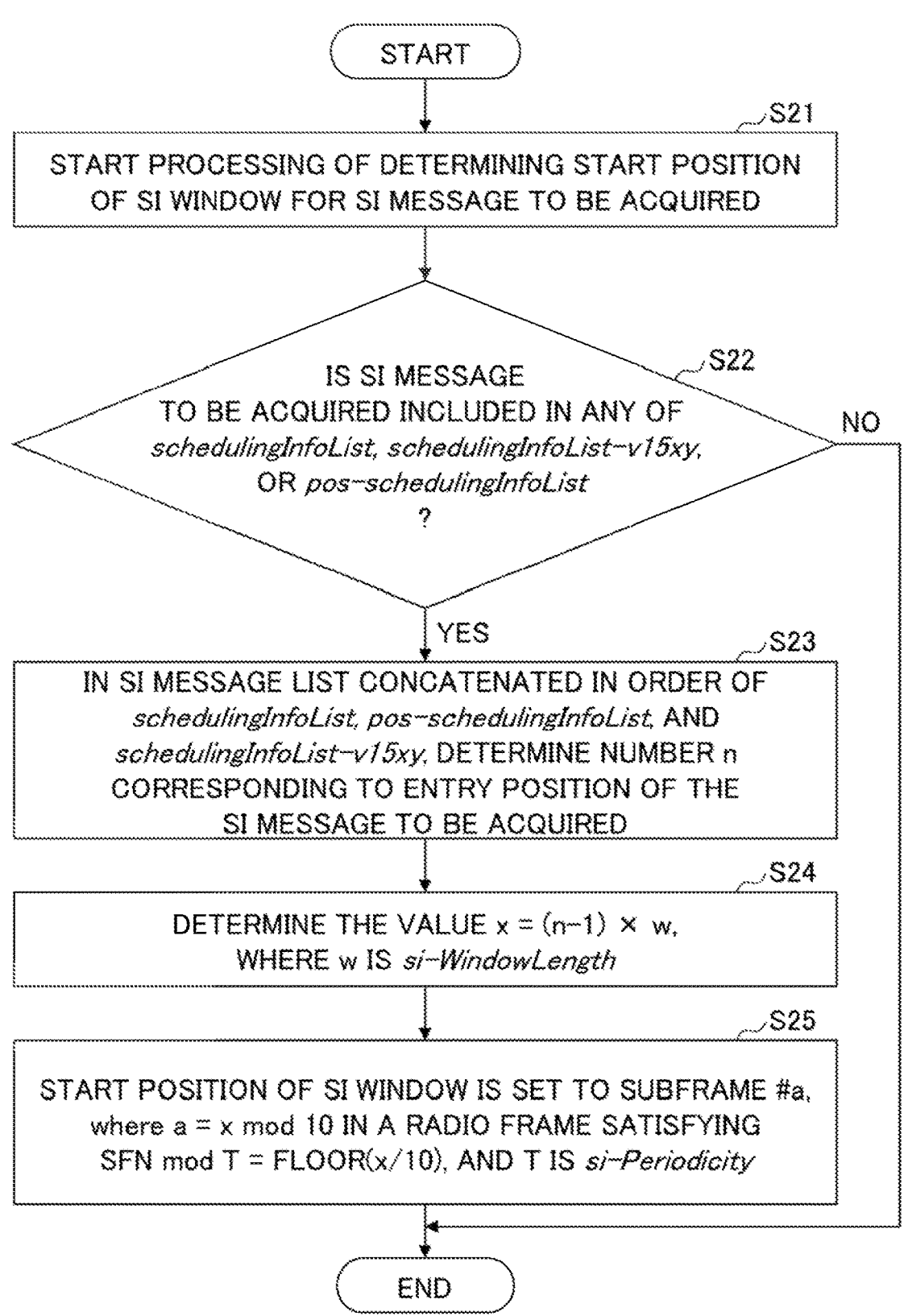

START

S21

START PROCESSING OF DETERMINING START POSITION
OF SI WINDOW FOR SI MESSAGE TO BE ACQUIRED

S22

IS SI MESSAGE
TO BE ACQUIRED INCLUDED IN ANY OF
*schedulingInfoList, schedulingInfoList-v15xy,*
OR *pos-schedulingInfoList*
?

NO

YES

S23

IN SI MESSAGE LIST CONCATENATED IN ORDER OF
*schedulingInfoList, pos-schedulingInfoList,* AND
*schedulingInfoList-v15xy,* DETERMINE NUMBER n
CORRESPONDING TO ENTRY POSITION OF THE
SI MESSAGE TO BE ACQUIRED

S24

DETERMINE THE VALUE x = (n−1) × w,
WHERE w IS *si-WindowLength*

S25

START POSITION OF SI WINDOW IS SET TO SUBFRAME #a,
where a = x mod 10 IN A RADIO FRAME SATISFYING
SFN mod T = FLOOR(x/10), AND T IS *si-Periodicity*

END

FIG.9

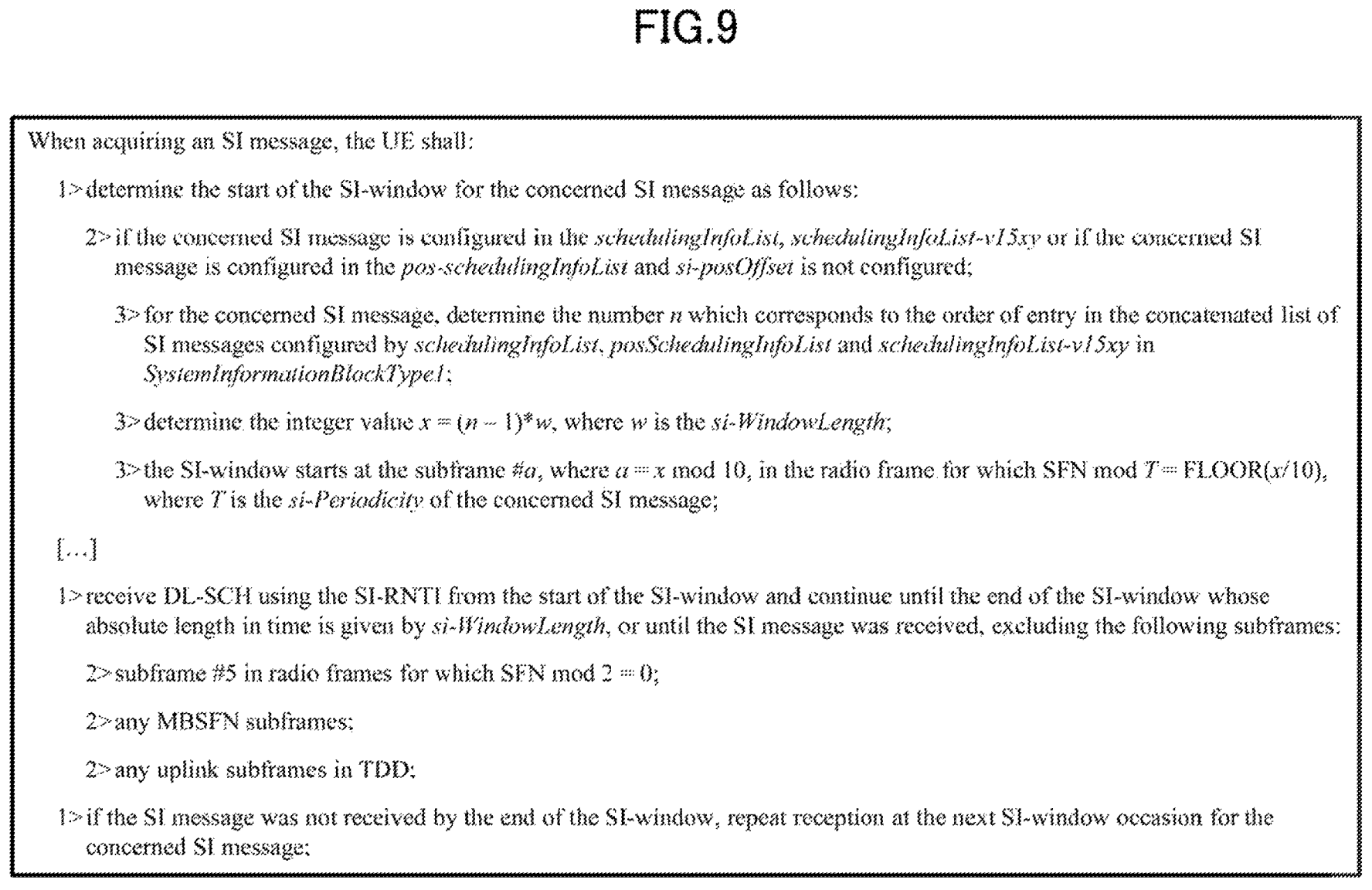

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured;

3> for the concerned SI message, determine the number *n* which corresponds to the order of entry in the concatenated list of SI messages configured by *schedulingInfoList*, *posSchedulingInfoList* and *schedulingInfoList-v15xy* in *SystemInformationBlockType1*;

3> determine the integer value $x = (n - 1)*w$, where $w$ is the *si-WindowLength*;

3> the SI-window starts at the subframe #$a$, where $a = x$ mod 10, in the radio frame for which SFN mod $T$ = FLOOR($x/10$), where $T$ is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

FIG.10

SystemInformationBlockType1 message

```
-- ASN1START
[...]
SystemInformationBlockType1-v10xy-IEs ::= SEQUENCE {
    -- This field is only for late non-critical extensions from Rel-10 or Rel-11 onwards
    lateNonCriticalExtension        OCTET STRING        OPTIONAL,
    nonCriticalExtension            SystemInformationBlockType1-v12xy-IEs        OPTIONAL
}

SystemInformationBlockType1-v12xy-IEs ::= SEQUENCE {
    schedulingInfoList-v12xy        SchedulingInfoList-v12xy OPTIONAL, -- Need OR
    nonCriticalExtension            SEQUENCE {}        OPTIONAL
}

SchedulingInfoList-v12xy ::= SEQUENCE (SIZE (1..maxSI-Message)) OF SchedulingInfo-v12xy SchedulingInfo-v12xy ::= SEQUENCE {
    si-Periodicity-v12xy    ENUMERATED {rf8, rf16, rf32, rf64, rf128, rf256, rf512}OPTIONAL, -- Need OP
    sib-MappingInfo-v12xy   SIB-MappingInfo-v12xy
}

SIB-MappingInfo-v12xy ::= SEQUENCE (SIZE (0..maxSIB-1)) OF SIB-Type-v12xy

SIB-Type-v12xy ::=
    ENUMERATED {
        sibType19-v1250, sibType20-v1310, sibType21-v1430,
        sibType24-v1530, sibType25-v1530, sibType6-v1530,
        sibType26a-v1610, sibType27-v1610, sibType28-v1610,
        sibType29-v1610, spare6, spare5,
        spare4, spare3, spare2, spare1, ...}

[...]
-- ASN1STOP
```

FIG.11

| *SystemInformationBlockType1* field descriptions |
|---|
| *schedulingInfoList* |
| Indicates scheduling information of SI messages. If *schedulingInfoList-v12xy* is present, the number of entries shall be greater than or equal to the one in *schedulingInfoList* (without suffix). Up to the number of entries in *schedulingInfoList* (without suffix), *schedulingInfoList-v12xy* provides additional SIBs mapped into the SI message scheduled via *schedulingInfoList* (without suffix). The first entry in *schedulingInfoList-v12xy* is applied to the first entry in *schedulingInfoList* (without suffix). The second entry in *schedulingInfoList-v12xy* is applied to the second entry in *schedulingInfoList* (without suffix), and so on. The entries in *schedulingInfoList-v12xy* to which there is no associated entry is *schedulingInfoList* (without suffix), provide additional scheduling information of SI messages. |
| *sib-MappingInfo* |
| List of the SIBs mapped to this *SystemInformation* message. There is no mapping information of SIB2; it is always present in the first *SystemInformation* message listed in the *schedulingInfoList* list. The *sib-MappingInfo* (without suffix) shall include at least one entry of the *SIB-Type*, except for the first *SystemInformation* message listed in the *schedulingInfoList* list. |
| *si-Periodicity, posSI-Periodicity* |
| Periodicity of the SI-message in radio frames, such that rf8 denotes 8 radio frames, rf16 denotes 16 radio frames, and so on. If the *si-posOffset* is configured, the *posSI-Periodicity* of rf8 cannot be used. The *si-Periodicity-v12xy* is absent, when the corresponding SI message is scheduled by *schedulingInfoList* (without suffix). |

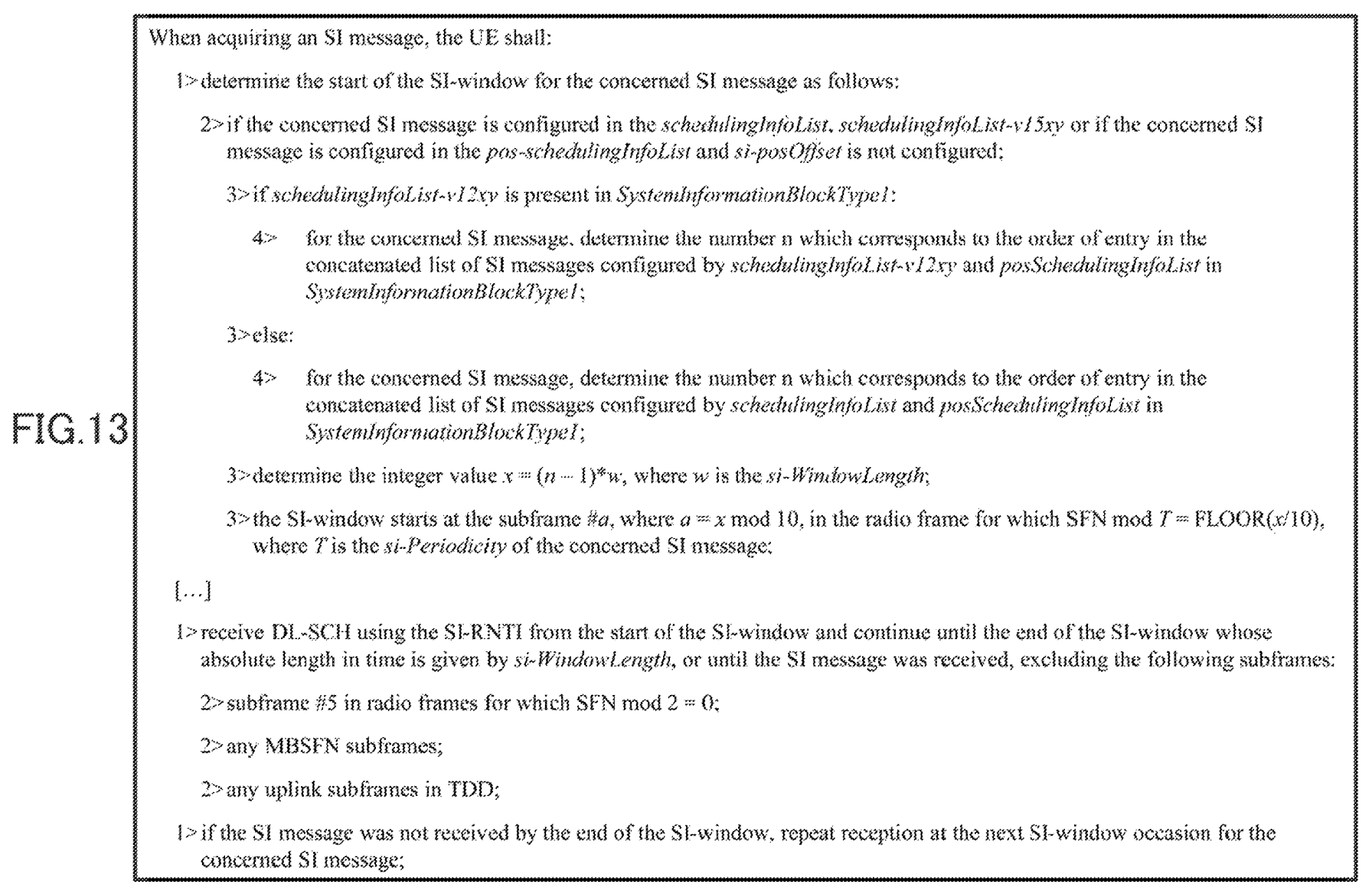

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured:

3> if *schedulingInfoList-v12xy* is present in *SystemInformationBlockType1*:

4>    for the concerned SI message, determine the number n which corresponds to the order of entry in the concatenated list of SI messages configured by *schedulingInfoList-v12xy* and *posSchedulingInfoList* in *SystemInformationBlockType1*;

3> else:

4>    for the concerned SI message, determine the number n which corresponds to the order of entry in the concatenated list of SI messages configured by *schedulingInfoList* and *posSchedulingInfoList* in *SystemInformationBlockType1*;

3> determine the integer value $x = (n - 1)*w$, where w is the *si-WindowLength*;

3> the SI-window starts at the subframe #a, where $a = x \bmod 10$, in the radio frame for which SFN mod $T = \text{FLOOR}(x/10)$, where T is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

FIG.13

Figure 14:
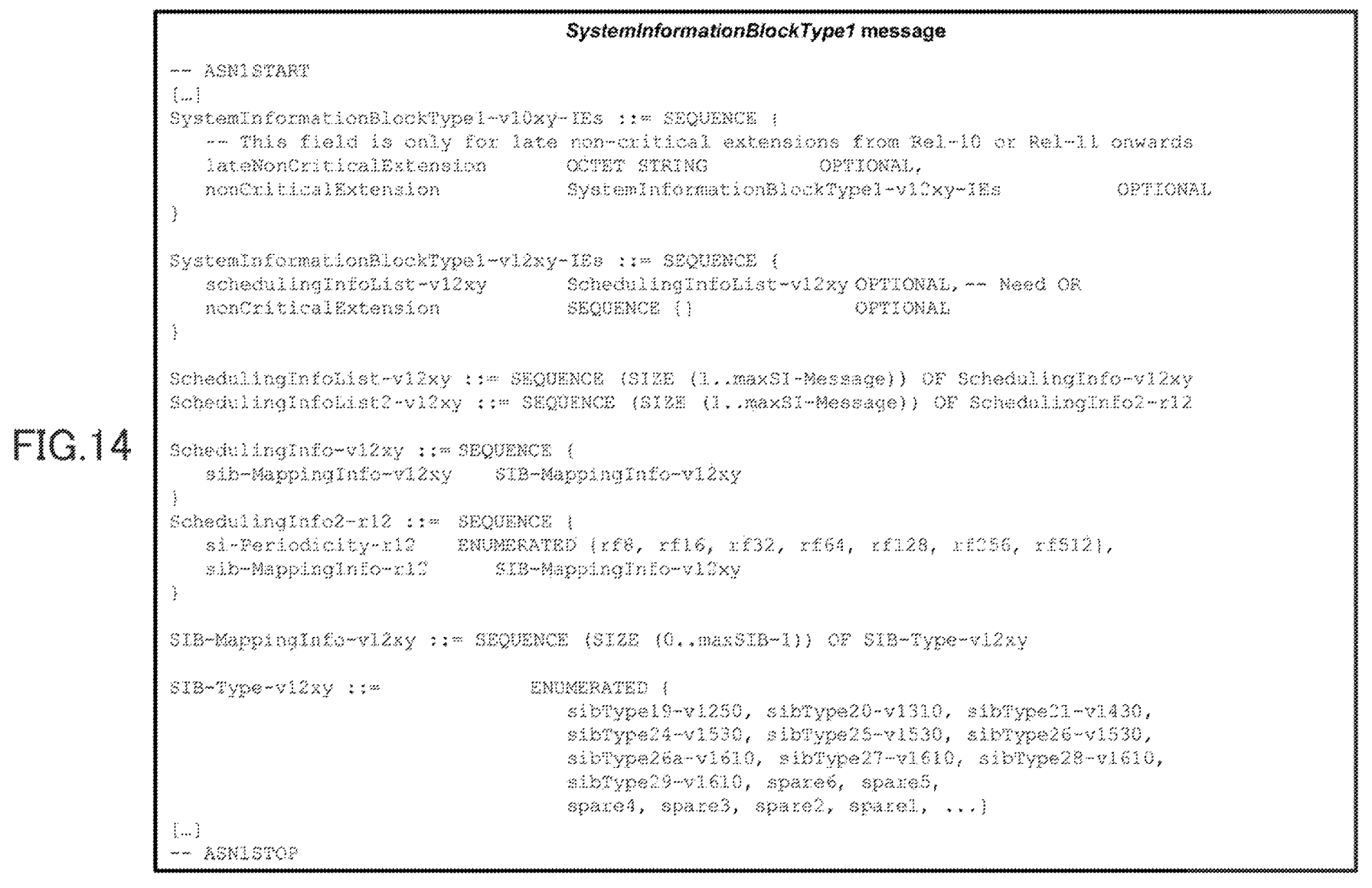

```
SystemInformationBlockType1 message

-- ASN1START
[...]
SystemInformationBlockType1-v12xy-IEs ::= SEQUENCE {
    -- This field is only for late non-critical extensions from Rel-10 or Rel-11 onwards
    lateNonCriticalExtension          OCTET STRING                             OPTIONAL,
    nonCriticalExtension              SystemInformationBlockType1-v12xy-IEs                    OPTIONAL
}

SystemInformationBlockType1-v12xy-IEs ::= SEQUENCE {
    schedulingInfoList-v12xy          SchedulingInfoList-v12xy OPTIONAL, -- Need OR
    nonCriticalExtension              SEQUENCE {}                              OPTIONAL
}

SchedulingInfoList-v12xy ::= SEQUENCE (SIZE (1..maxSI-Message)) OF SchedulingInfo-v12xy
SchedulingInfoList2-v12xy ::= SEQUENCE (SIZE (1..maxSI-Message)) OF SchedulingInfo2-r12

SchedulingInfo-v12xy ::= SEQUENCE {
    sib-MappingInfo-v12xy    SIB-MappingInfo-v12xy
}

SchedulingInfo2-r12 ::= SEQUENCE {
    si-Periodicity-r12       ENUMERATED {rf8, rf16, rf32, rf64, rf128, rf256, rf512},
    sib-MappingInfo-r13      SIB-MappingInfo-v12xy
}

SIB-MappingInfo-v12xy ::= SEQUENCE (SIZE (0..maxSIB-1)) OF SIB-Type-v12xy

SIB-Type-v12xy ::=
    ENUMERATED {
        sibType19-v1250, sibType20-v1310, sibType21-v1430,
        sibType24-v1530, sibType25-v1530, sibType26-v1530,
        sibType26a-v1610, sibType27-v1610, sibType28-v1610,
        sibType29-v1610, spare6, spare5,
        spare4, spare3, spare2, spare1, ...}

[...]
-- ASN1STOP
```

SystemInformationBlockType1 field descriptions schedulingInfoList

Figure 15:
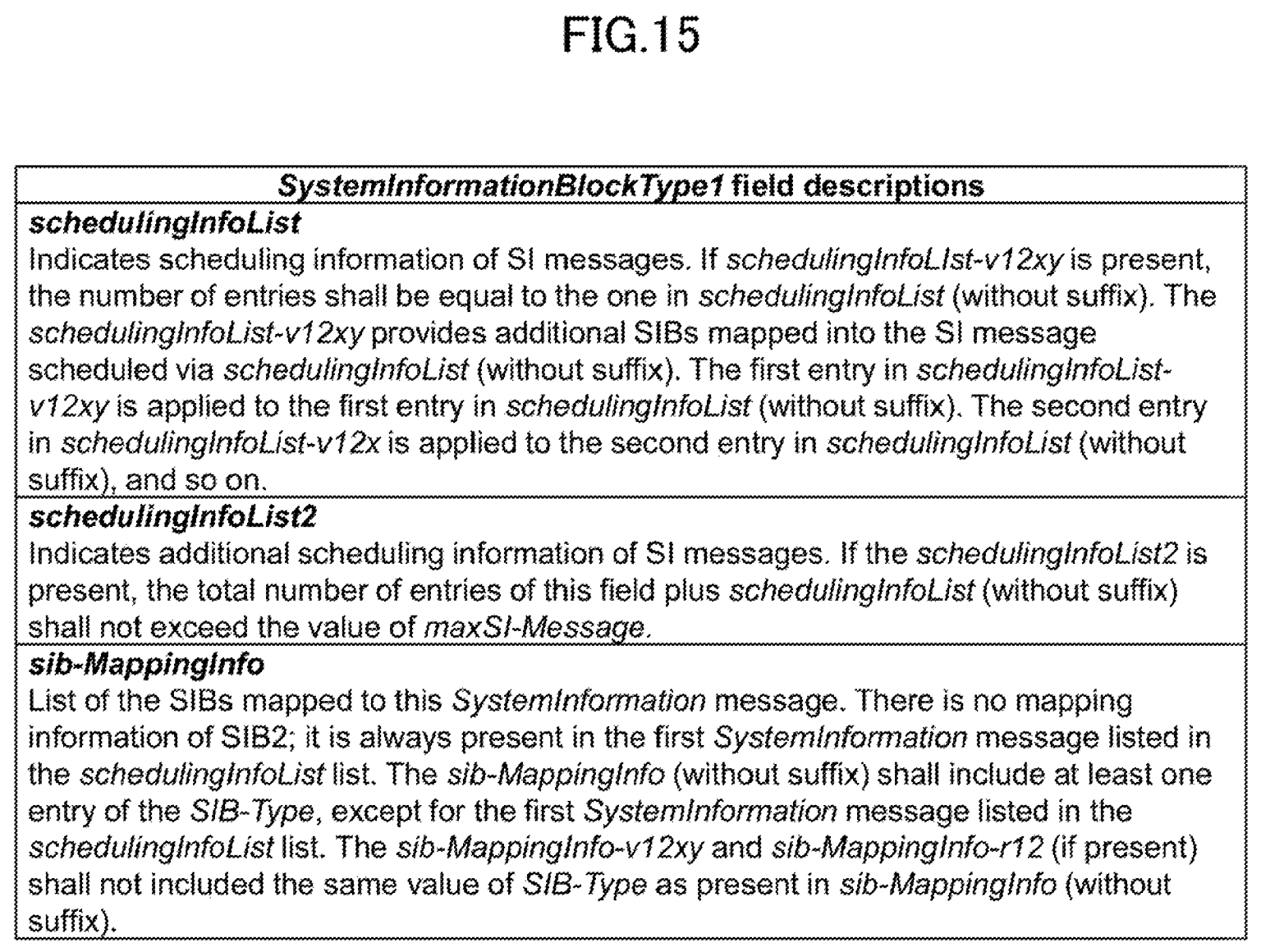

Indicates scheduling information of SI messages. If *schedulingInfoList-v12xy* is present, the number of entries shall be equal to the one in *schedulingInfoList* (without suffix). The *schedulingInfoList-v12xy* provides additional SIBs mapped into the SI message scheduled via *schedulingInfoList* (without suffix). The first entry in *schedulingInfoList-v12xy* is applied to the first entry in *schedulingInfoList* (without suffix). The second entry in *schedulingInfoList-v12x* is applied to the second entry in *schedulingInfoList* (without suffix), and so on.

schedulingInfoList2

Indicates additional scheduling information of SI messages. If the *schedulingInfoList2* is present, the total number of entries of this field plus *schedulingInfoList* (without suffix) shall not exceed the value of *maxSI-Message*.

sib-MappingInfo

List of the SIBs mapped to this *SystemInformation* message. There is no mapping information of SIB2; it is always present in the first *SystemInformation* message listed in the *schedulingInfoList* list. The *sib-MappingInfo* (without suffix) shall include at least one entry of the *SIB-Type*, except for the first *SystemInformation* message listed in the *schedulingInfoList* list. The *sib-MappingInfo-v12xy* and *sib-MappingInfo-r12* (if present) shall not included the same value of *SIB-Type* as present in *sib-MappingInfo* (without suffix).

FIG.16

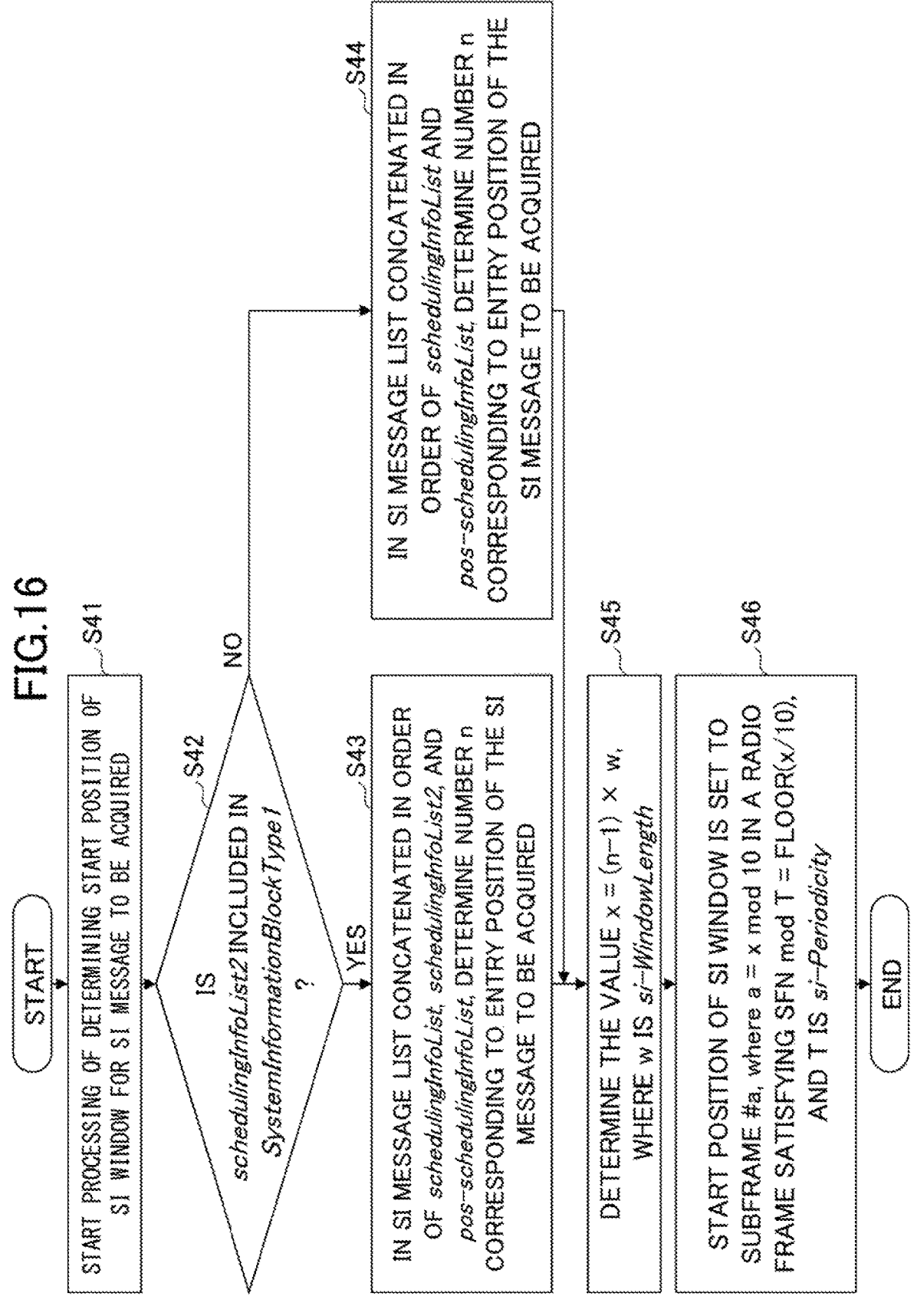

START

S41 — START PROCESSING OF DETERMINING START POSITION OF SI WINDOW FOR SI MESSAGE TO BE ACQUIRED

S42 — IS *schedulingInfoList2* INCLUDED IN *SystemInformationBlockType1* ?

NO

YES

S43 — IN SI MESSAGE LIST CONCATENATED IN ORDER OF *schedulingInfoList*, *schedulingInfoList2*, AND *pos-schedulingInfoList*, DETERMINE NUMBER n CORRESPONDING TO ENTRY POSITION OF THE SI MESSAGE TO BE ACQUIRED S44 — IN SI MESSAGE LIST CONCATENATED IN ORDER OF *schedulingInfoList* AND *pos-schedulingInfoList*, DETERMINE NUMBER n CORRESPONDING TO ENTRY POSITION OF THE SI MESSAGE TO BE ACQUIRED S45 — DETERMINE THE VALUE $x = (n-1) \times w$, WHERE w IS *si-WindowLength*

S46 — START POSITION OF SI WINDOW IS SET TO SUBFRAME #a, where $a = x$ mod 10 IN A RADIO FRAME SATISFYING SFN mod $T = FLOOR(x/10)$, AND T IS *si-Periodicity*

END

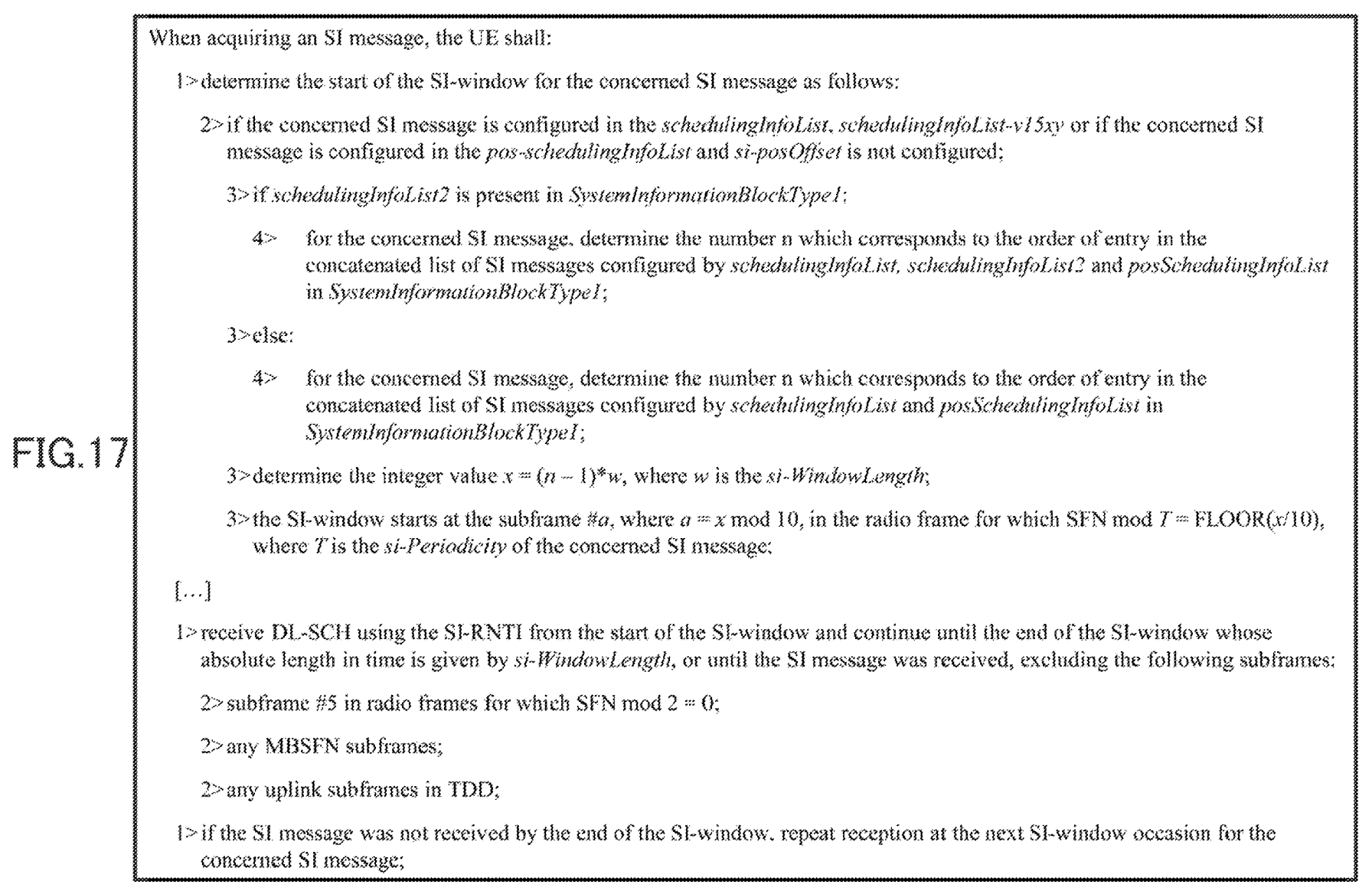

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured:

3> if *schedulingInfoList2* is present in *SystemInformationBlockType1*:

4> for the concerned SI message, determine the number *n* which corresponds to the order of entry in the concatenated list of SI messages configured by *schedulingInfoList*, *schedulingInfoList2* and *posSchedulingInfoList* in *SystemInformationBlockType1*;

3> else:

4> for the concerned SI message, determine the number *n* which corresponds to the order of entry in the concatenated list of SI messages configured by *schedulingInfoList* and *posSchedulingInfoList* in *SystemInformationBlockType1*;

3> determine the integer value $x = (n - 1)*w$, where *w* is the *si-WindowLength*;

3> the SI-window starts at the subframe #*a*, where $a = x \bmod 10$, in the radio frame for which SFN mod $T$ = FLOOR($x$/10), where *T* is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

FIG.17

TERMINAL, BASE STATION, AND COMMUNICATION METHOD

TECHNICAL FIELD

The present invention relates to a terminal, a base station, and a communication method in a radio communication system.

BACKGROUND ART

In the Long Term Evolution (LTE) and New Radio (NR) that is a LTE successor system (also referred to as "5G"), a terminal acquires system information (SI, System Information) broadcasted from a base station and configures a frequency band, a bandwidth, and the like to be used for downlink or uplink, for example. If the cell is not barred in the system information, the terminal can camp on the cell (for example, Non-Patent Document 1).

RELATED ART DOCUMENT

Non-Patent Document

Non-Patent Document 1: 3GPP TS 36.331 V15.10.0 (2020 July)

SUMMARY OF THE INVENTION

Problem to be Solved by the Invention

System information scheduling is executed by using System Information Block Type 1 (SIB1). For example, when system information is extended for functional enhancement or the like, it is necessary to specify a scheduling method so that the terminal can acquire system information correctly.

The present invention has been accomplished in view of the above-described point, and an object is to schedule extended system information.

Means for Solving the Problem

According to the disclosed technique, there is provided a terminal including a receiving unit that receives first system information from a base station; and a control unit that acquires, from the first system information, a first list, a second list, and a third list, the first list scheduling second system information other than the first system information, and determines, based on the second list and the third list, a start position of a window for acquiring the second system information, wherein the receiving unit receives, from the base station, the second system information in the window.

Advantage of the Invention

According to the disclosed technique, extended system information can be scheduled.

BRIEF DESCRIPTION OF DRAWINGS

FIG. 1 is a diagram illustrating an example (1) of a configuration of a radio communication system according to an embodiment of the present invention.

FIG. 2 is a diagram illustrating an example (2) of a configuration of a radio communication system according to an embodiment of the present invention.

FIG. 4 is a diagram illustrating an example (1) of a modification of a technical specification according to an embodiment of the present invention.

FIG. 5 is a diagram illustrating an example (2) of a modification of a technical specification according to an embodiment of the present invention.

FIG. 7 is a diagram illustrating an example (3) of a modification of a technical specification according to an embodiment of the present invention.

FIG. 8 is a flowchart for illustrating an example (2) of system information acquisition in an embodiment of the present invention.

FIG. 9 is a diagram illustrating an example (4) of a modification of a technical specification according to an embodiment of the present invention.

FIG. 10 is a diagram illustrating an example (5) of a modification of a technical specification according to an embodiment of the present invention.

FIG. 11 is a diagram illustrating an example (6) of a modification of a technical specification according to an embodiment of the present invention.

FIG. 13 is a diagram illustrating an example (7) of a modification of a technical specification according to an embodiment of the present invention.

FIG. 14 is a diagram illustrating an example (8) of a modification of a technical specification according to an embodiment of the present invention.

FIG. 15 is a diagram illustrating an example (9) of a modification of a technical specification according to an embodiment of the present invention.

FIG. 16 is a flowchart for illustrating an example (4) of system information acquisition in an embodiment of the present invention.

FIG. 17 is a diagram illustrating an example (10) of a modification of a technical specification according to an embodiment of the present invention.

EMBODIMENTS OF THE INVENTION

Figure 3:
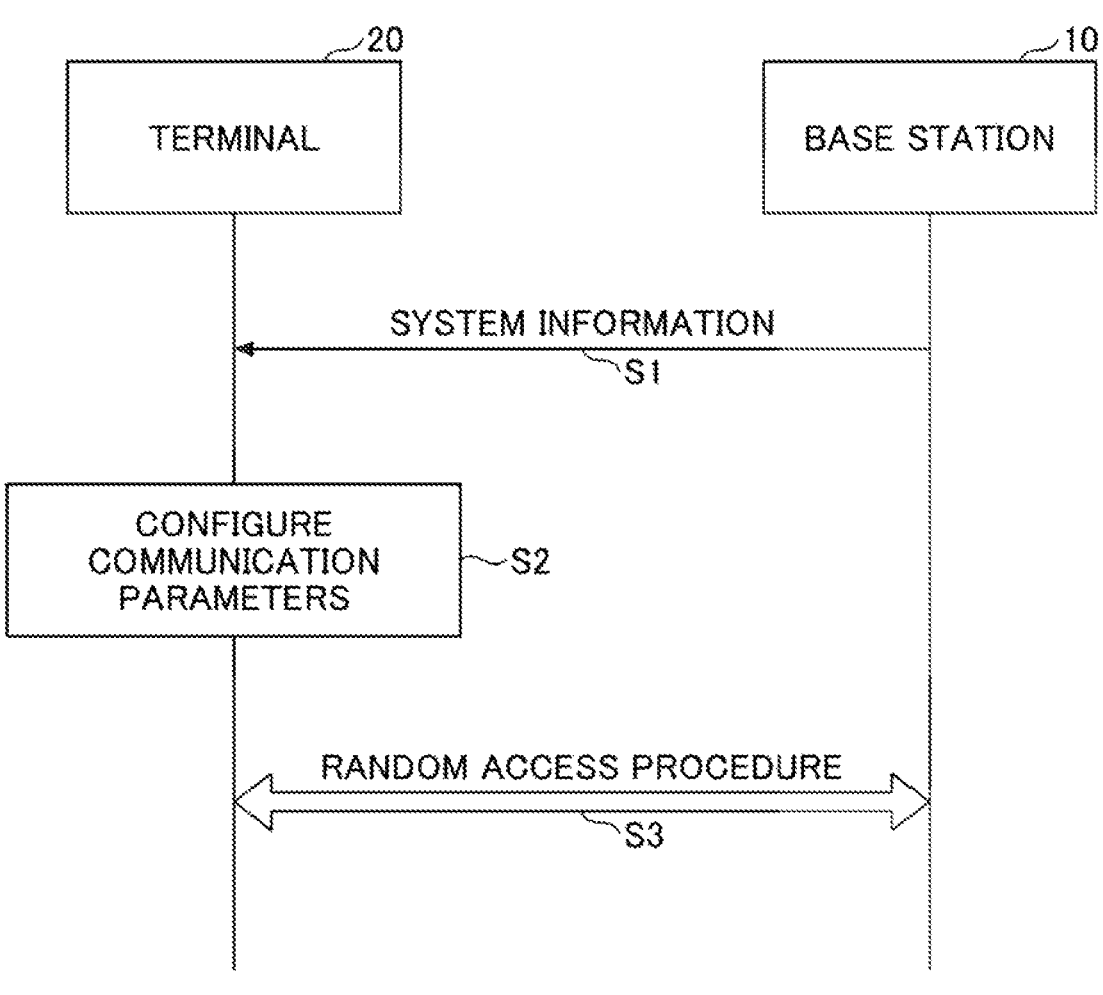
FIG. 3 is a sequence diagram illustrating an example of system information acquisition in an embodiment of the present invention.

In the following, embodiments of the present invention are described with reference to the drawings. Note that the embodiments described below are an example, and embodiments to which the present invention is applied are not limited to the following embodiments.

In an operation of a radio communication system of an embodiment of the present invention, existing technology is used as appropriate. Here, the existing technology is, for example, existing LTE but is not limited to the existing LTE. Furthermore, the term "LTE" used in this specification has a broad meaning including LTE-Advanced and a system subsequent to LTE-Advanced (for example, NR), unless as otherwise specified.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channel (PUCCH), Physical Uplink Shared Channel (PUSCH), and the like. This is for convenience of description, and signals, functions, and the like, similar to these may be referred to by other names. The above-described terms in NR correspond to NR-SS, NR-PSS, NR-SSS, NR-PBCH, NR-PRACH, NR-PDCCH, NR-PDSCH, NR-PUCCH, NR-PUSCH, and the like. However, even if a signal is used for NR, the signal is not always explicitly specified as "NR-."

In the embodiments of the present invention, a duplex method may be a Time Division Duplex (TDD) method, an Frequency Division Duplex (FDD) method, or any other method (e.g., Flexible Duplex).

In the embodiments of the present invention, "configuring" or "specifying" a radio parameter or the like, may be "pre-configuring" a predetermined value for a radio parameter or the like, may be configuring a value transmitted from a base station 10 or a terminal 20 for a radio parameter or the like, or may be preconfiguring a value for a radio parameter or the like according to a technical specification.

Figure 1:
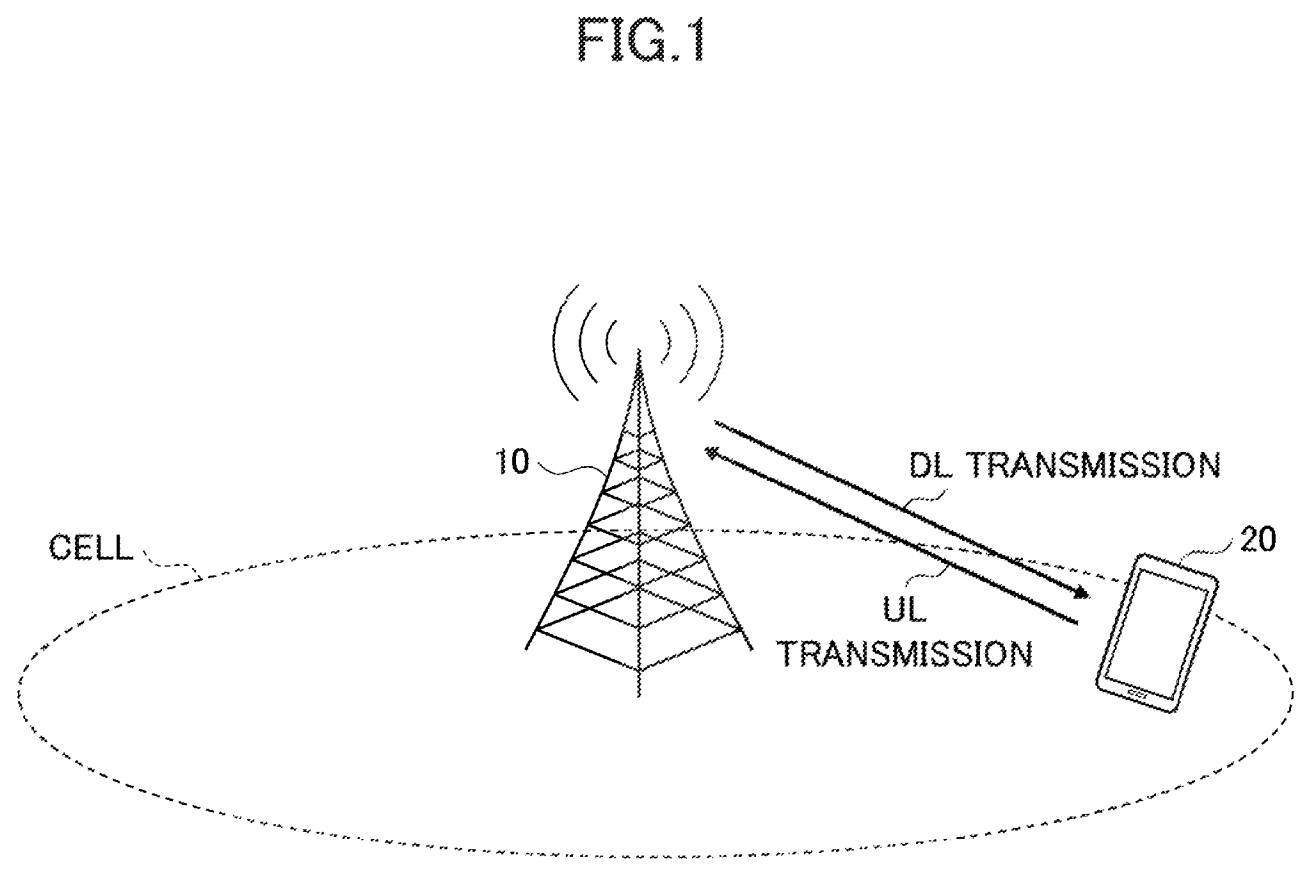

FIG. 1 is a diagram illustrating an example (1) of a configuration of a radio communication system according to an embodiment of the present invention. As illustrated in FIG. 1, a base station 10 and a terminal 20 are included. In FIG. 1, one base station 10 and one terminal 20 are illustrated. However, this is an example, and there may be a plurality of base stations 10 and a plurality of terminals 20. Note that the terminal 20 may be referred to as a "user equipment," a "UE (User Equipment)," or the like.

The base station 10 provides one or more cells, and the base station 10 is a communication device for performing radio communication with the terminal 20. A physical resource of a radio signal may be defined in a time domain and a frequency domain, the time domain may be defined in terms of a slot or an Orthogonal Frequency Division Multiplexing (OFDM) symbols, and the frequency domain may be defined in terms of a sub-band, a subcarrier, or a resource block.

As illustrated in FIG. 1, the base station 10 transmits control information or data to the terminal 20 on DL (Downlink), and the base station 10 receives control information or data from the terminal 20 on UL (Uplink). Each of the base station 10 and the terminal 20 can transmit and receive signals by performing beamforming. Furthermore, the base station 10 and the terminal 20 can apply Multiple Input Multiple Output (MIMO) based communication to DL or UL. Furthermore, the base station 10 and the terminal 20 may communicate through a Secondary Cell (SCell) and a Primary Cell (PCell) based on Carrier Aggregation (CA).

The terminal 20 is a communication device provided with a radio communication function, such as a smartphone, a cellular phone, a tablet, a wearable terminal, a communication module for Machine-to-Machine (M2M), or the like. As illustrated in FIG. 1, the terminal 20 utilizes various communication services provided by a radio communication system by receiving control information or data in DL from the base station 10 and transmitting control information or data in UL to the base station 10.

Figure 2:
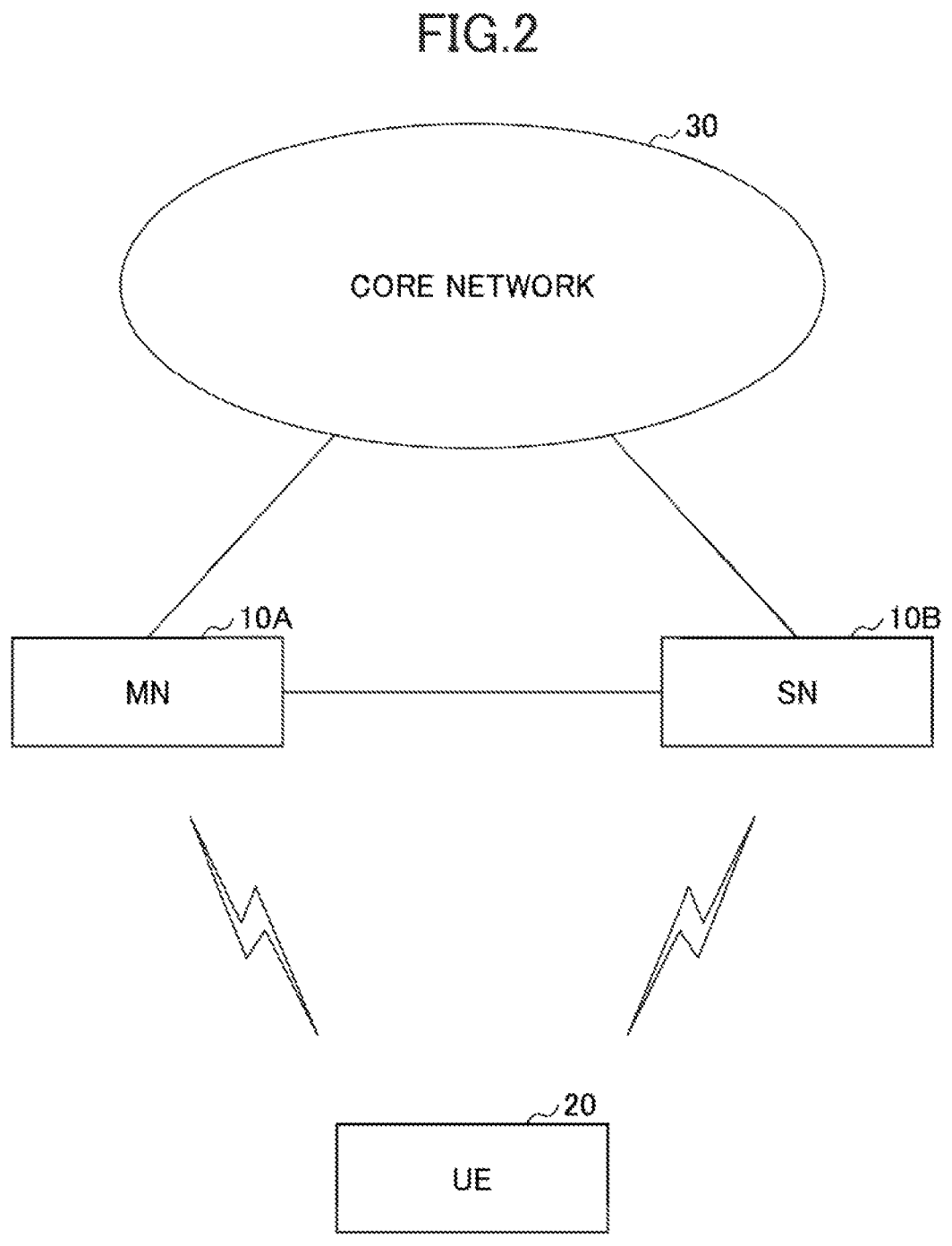

FIG. 2 is a diagram for illustrating an example (2) of a configuration of a radio communication system according to an embodiment of the present invention FIG. 2 illustrates an example of a configuration of a radio communication system when NR-Dual connectivity (NR-DC) is executed. As illustrated in FIG. 2, a base station 10A serving as a Master Node (MN) and a base station 10B serving as a Secondary Node (SN) are provided. Each of the base station 102 and the base station 10B is connected to a core network 30. The terminal 20 that is a UE communicates with both the base station 10A and the base station 10B. Here, a radio communication system based on E-UTRA NR DC (EN-DC) may, be configured, in which the MN is an LTE base station, and the SN is an DR base station.

A cell group provided by the base station 10A that is the MN is called a Master Cell Group (MCG), and a cell group provided by the base station 10B that is the SN is called a Secondary Cell Group (SCG). The operations described below may assume a network configuration operated in the dual connectivity in FIG. 2, or may assume a network configuration operated in the standalone mode in FIG. 1.

FIG. 3 is a sequence diagram illustrating an example of system information acquisition according to an embodiment of the present invention. At step S1, the terminal 20 receives system information (SI, system information) from the base station 10 via the cell. For example, system information may include Master Information Block (MIB) and System Information Block Type 1 or System Information Block 1 (SIB1). The MIB is system information transmitted on PBCH. SIB1 may include information on whether accessing a cell is allowed, scheduling of any other system information, a radio resource configuration common for UEs, access barring, and the like.

In step S2, the terminal 20 configures a communication parameter based on the acquired system information. For example, a frequency band, a bandwidth, and the like used for downlink or uplink are configured. If the cell is not barred in the system information, the terminal 20 may camp on the cell.

If necessary, the terminal 20 and base station 10 may perform a random access procedure as illustrated in step S3. For example, the terminal 20 may apply, at step S2, the communication parameter set based on the system information, and the terminal 20 may perform an uplink transmission Upon completion of the random access procedure, the terminal 20 and the base station 10 may perform normal communication.

FIG. 4 is a diagram illustrating an example (1) of a modification of a technical specification according to an embodiment of the present invention. As illustrated in FIG. 4, new system information "SystemInformationBlock-Type1-v15xy-IEs" may be defined as part of SIB1. By using the schedulingInfoList-v15xy, the configured SI is scheduled.

As illustrated in FIG. 4, by the "si-Periodicity-r15," one of the following can be configured as periodicity of the system information: rf8 representing 8 radio frames each having duration of 10 ms; rf16 representing 16 radio frames; rf32 representing 32 radio frames; rf64 representing 64 radio frames; rf128 representing 128 radio frames; rf256 representing 256 radio frames; and rf512 representing 512 radio frames.

As illustrated in FIG. 4, the "SIB-Type-v15xy" representing the scheduled SIB can configure SIB19, SIB20, SIB21, SIB24, SIB25, SIB26, and the like, as the system information.

FIG. 5 is a diagram illustrating an example (2) of a modification of a technical specification according to an embodiment of the present invention. As illustrated in FIG. 5, the "schedulingInfoList" may schedule system information from SIB3 to SIB18. The "schedulingInfoList-v15xy" may schedule system information from SIB19 onwards. Furthermore, as illustrated in FIG. 5, "schedulingInfoList-v15xy" may be defined not to schedule a SIB that is the same as that of the "schedulingInfoList."

Figure 6:
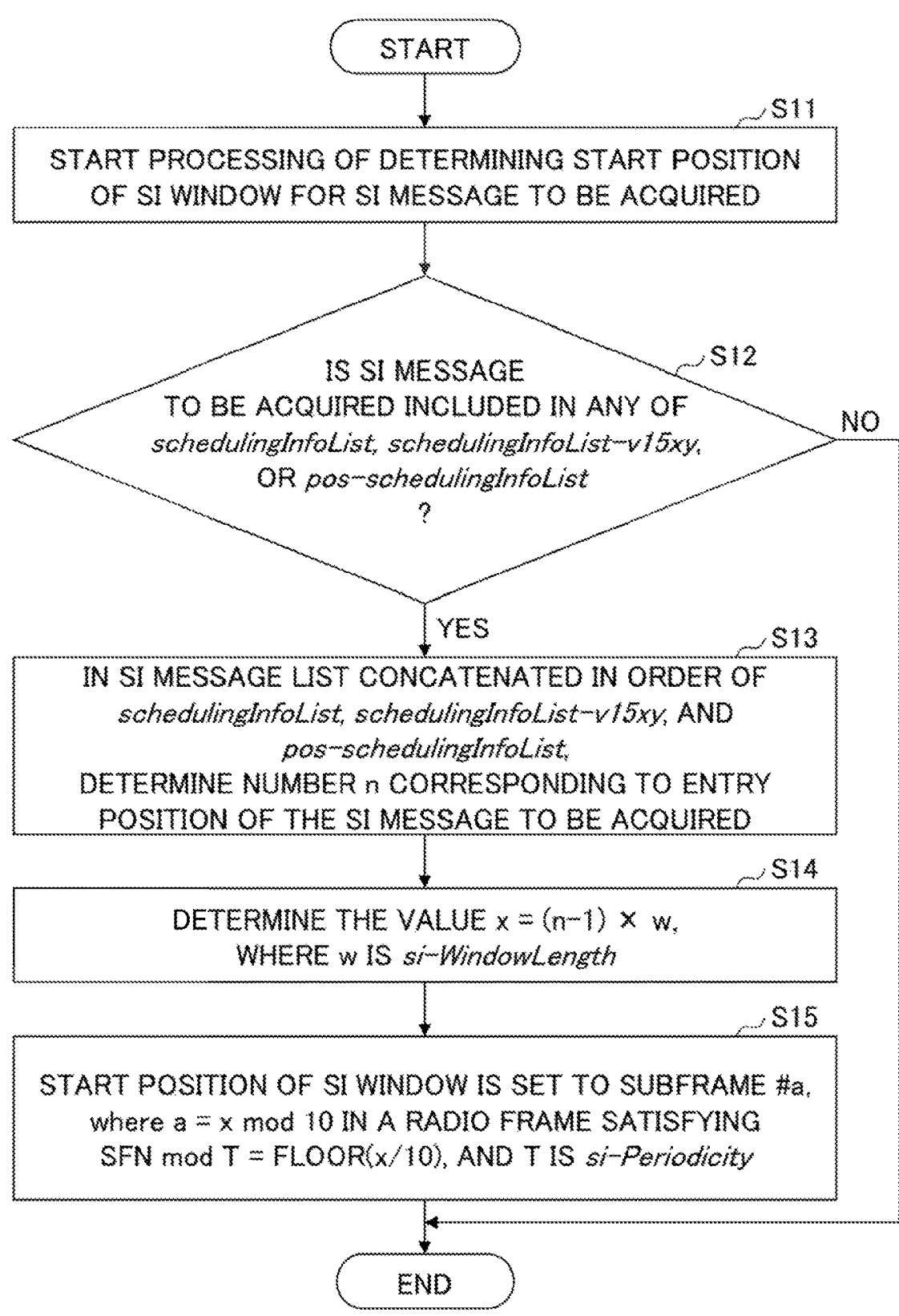
FIG. 6 is a flowchart for illustrating an example (1) of system information acquisition in an embodiment of the present invention.

FIG. 6 is a flowchart illustrating an example (1) of system information acquisition according to an embodiment of the present invention. In step S11, the terminal 20 starts a process of determining a start position of an SI window for receiving the SI message to be acquired. At subsequent step S12, the terminal 20 determines whether the SI message to be acquired is included in any of "schedulingInfoList," "schedulingInfoList-v15xy," or "pos-schedulingInfoList." If the SI message to be acquired is included in any of the above-described information elements (YES at S12), the process proceeds to step S13. If the SI message to be acquired is not included in any of the above-described information elements (NO at S12), the flow ends.

At step S12, a condition that "si-posOffset" is not configured may be added. If the "si-posOffset" is present, system information is scheduled by the "pos-schedulingInfoList" with an offset of 8 radio frames from the system information scheduled by the "schedulingInfoList." Note that the "pos-schedulingInfoList" is system information related to location information, and, for example, the "pos-schedulingInfoList" includes assistance data and the like for the Global Navigation Satellite System (CNSS).

At step S13, the terminal 20 determines the number n corresponding to the entry position of the SI message to be acquired in the list of SI messages concatenated in the order of "schedulingInfoList," "schedulingInfoList-v15xy," and "pos-schedulingInfoList."

At subsequent step S14, the terminal 20 determines a value x as (n−1)×w, where w is si-WindowLength representing the length of the SI window. For example, si-WindowLength may be set to 1 ms, 2 ms, 5 ms, 10 ms, 15 ms, 20 ms, or 40 ms.

At subsequent step S15, the terminal 20 sets the start position of the SI window to the subframe #a, where a=x mod 10 in a radio frame satisfying SFN mod T=FLOOR (x/10) and T is si-Periodicity representing the periodicity of the SI. For example, by using the si-Periodicity, the periodicity of the system information can be set to one of the following: rf8 representing 8 radio frames; rf16 representing 16 radio frames; rf32 representing 32 radio frames; rf64 representing 64 radio frames; rf128 representing 128 radio frames; rf256 representing 256 radio frames; and rf512 representing 512 radio frames, each having the duration of 10 ms.

FIG. 7 is a diagram illustrating an example (3) of a modification of a technical specification according to an embodiment of the present invention FIG. 7 is an example of a modified technical specification corresponding to the flowchart of FIG. 6. As illustrate in FIG. 7, the terminal 20 may determine the number n corresponding to the entry position of the SI message to be acquired in the list of SI messages concatenated in the order of "schedulingInfoList," "schedulingInfoList-v15xy," and "pos-schedulingInfoList."

FIG. 8 is a flowchart illustrating an example (2) of system information acquisition according to an embodiment of the present invention. At step S21, the terminal 20 starts the process of determining the start position of the SI window for receiving the SI message to be acquired. At subsequent step S22, the terminal 20 determines whether the SI message to be acquired is included in "schedulingInfoList," "schedulingInfoList-v15xy," or "pos-schedulingInfoList." When the SI message to be acquired is included in any of the above-mentioned information elements (YES at S22), the process proceeds to step S23. When the SI message to be acquired is not included in any of the above-described information elements (NO at S22), the flow ends.

At step S22, a condition that the "si-posOffset" is not configured may be added. If the "si-posOffset" is present system information is scheduled by the "pos-schedulingInfoList" with an offset of 8 radio frames from the system information scheduled by the "schedulingInfoList."

At step S23, the terminal 20 determines the number n corresponding to the entry position of the SI message to be acquired in the list of SI messages concatenated in the order of "schedulingInfoList," "pos-schedulingInfoList," and "schedulingInfoList-v15xy."

At subsequent step S24, the terminal 20 determines a value x as (n−1)×w, where w is si-WindowLength representing the length of the SI window.

At subsequent step S25, the terminal 20 sets the start position of the SI window to the subframe #a, where a=x mod 10 in a radio frame with SFN mod T=FLOOR (x/10) and T is si-Periodicity representing the periodicity of the SI.

FIG. 9 is a diagram illustrating an example (4) of a modification of a technical specification according to an embodiment of the present invention FIG. 9 is an example of a modified technical specification corresponding to the flowchart of FIG. 8. Its illustrate in FIG. 9, the terminal 20 may determine the number n corresponding to the entry position of the SI message to be acquired in the list of SI messages concatenated in the order of "schedulingInfoList," "pos-schedulingInfoList," and "schedulingInfoList-v15xy."

FIG. 10 is a diagram illustrating an example (5) of a modification of a technical specification according to an embodiment of the present invention. As illustrated in FIG. 10, new system information "SystemInformationBlock-Type1-v12xy-IEs" may be defined as a part of SIB1. By using the "schedulingInfoList-v12xy," the configured SI is scheduled.

As illustrated in FIG. 10, by using the "si-Periodicity-r12xy", the periodicity of the system information can be set to one of the following: rf8 representing 8 radio frames each having the duration of 10 ms; rf16 representing 16 radio frames; rf32 representing 32 radio frames; rf64 representing 64 radio frames; rf128 representing 128 radio frames; rf256 representing 256 radio frames; and, rf512 representing 512 radio frames.

As illustrated in FIG. 10, the "SIB-Type-v12xy" representing the scheduled SIB can configure SIB19, SIB20, SIB21, SIB24, SIB25, SIB26, SIB27, SIB28, SIB29 and the like, as the system information.

FIG. 11 is a diagram illustrating an example (6) of a modification of a technical specification according to an embodiment of the present invention. As illustrated in FIG. 11, the number of entries of the "schedulingInfoList-v12xy" is set to exceed the number of entries of the "schedulingInfoList." The first entry of the "schedulingInfoList-v12xy" corresponds to the first entry of the "schedulingInfoList." The second entry of the "schedulingInfoList-v12xy" corresponds to the second entry of the "schedulingInfoList."

Namely, the entries set to the "schedulingInfoList-v12xy" correspond to the entries set to the "schedulingInfoList" in the order of the entries. The entries of the "schedulingInfoList-v12xy" that exceeds the number of entries set in the "schedulingInfoList" are not associated with the "schedulingInfoList," and the entries of the "schedulingInfoList-v12xy" that exceeds the number of entries set in the "schedulingInfoList" schedule additional SI messages.

As illustrated in FIG. 11, the SI message in the "sib-MappingInfo" includes at least one entry of SIB, except for the first SI message listed in the "schedulingInfoList."

As illustrated in FIG. 11, for the "si-Periodicity" and the "posSI-Periodicity," when the corresponding SI message is scheduled by the "schedulingInfoList," the "si-Periodicity-v12xy" may be absent.

Figure 12:
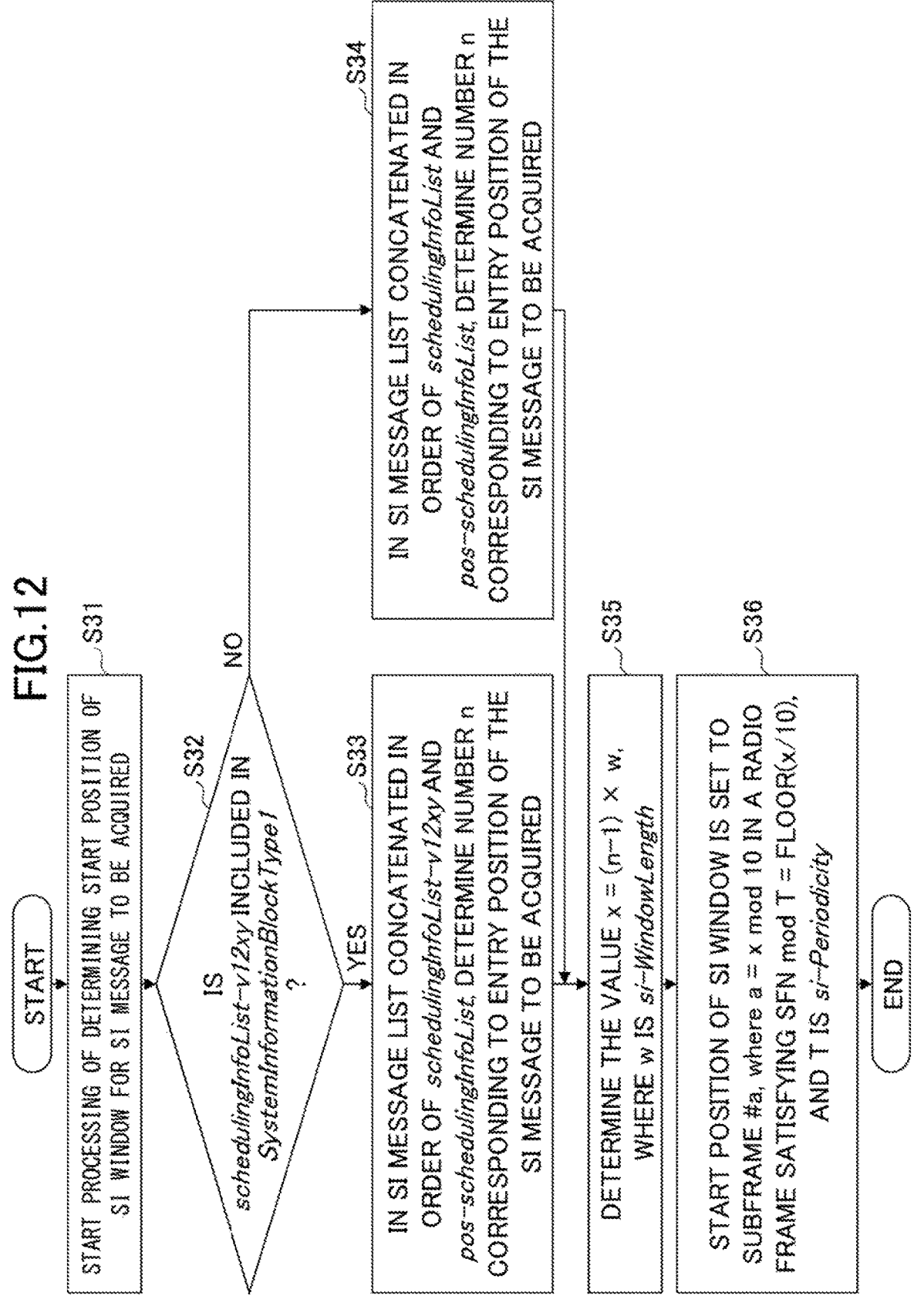
FIG. 12 is a flowchart for illustrating an example (3) of system information acquisition in an embodiment of the present invention.

FIG. 12 is a flowchart for illustrating an example (3) of system information acquisition according to an embodiment of the present invention. At step S31, the terminal 20 starts the process of determining the start, position of the SI window for receiving the SI message to be acquired. At step S32, the terminal 20 determines whether the "schedulingInfoList-v12xy" is included in the "SystemInformationBlockType1." If included (YES at S32), the process proceeds to step S33. If not included (NO at S32), the process proceeds to step S34.

At step S33, the terminal 20 determines the number n corresponding to the entry position of the SI message to be acquired in the list of SI messages concatenated in the order of "schedulingInfoList-v12xy" and "pos-schedulingInfoList."

At step S34, the terminal 20 determines the number n corresponding to the entry position of the SI message to be acquired in the list of SI messages concatenated in the order of "schedulingInfoList" and "pos-schedulingInfoList."

At subsequent step S35, the terminal 20 determines a value x as $(n-1) \times w$, where w is si-WindowLength representing the length of the SI window. For example, si-WindowLength may be set to 1 ms, 2 ms, 5 ms, 10 ms, 18 ms, 20 ms, or 40 ms.

At subsequent step S36, the terminal 20 sets the start position of the SI window to the subframe #a, where a=x mod 10 in a radio frame with SFN mod T=FLOOR (x/10) and T is si-Periodicity representing the periodicity of the SI. For example, by using the si-Periodicity, the periodicity of the system information can be set to one of the following: rf8 representing 8 radio frames each having the duration of 10 ms; rf16 representing 16 radio frames; rf32 representing 32 radio frames; rf64 representing 64 radio frames; rf128 representing 128 radio frames; rf256 representing 256 radio frames; and rf512 representing 512 radio frames.

Prior to executing step S32, the process may proceed to step S33 only if the "si-posOffset" is absent. If the "si-posOffset" is present, system information is scheduled by the "pos-schedulingInfoList" with an offset of 8 radio frames from the system information scheduled by the "schedulingInfoList-v12xy." Note that the "pos-schedulingInfoList" is the system information related to the location information, and the "pos-schedulingInfoList" includes assistance data and the like for the GNSS.

FIG. 13 is a diagram illustrating an example (7) of a modification of a technical specification according to an embodiment of the present invention FIG. 13 is an example of a modified technical specification corresponding to the flowchart of FIG. 12. As illustrate in FIG. 13, the terminal 20 may determine the number n corresponding to the entry position of the SI message to be acquired in the list of SI messages concatenated in the order of "schedulingInfoList-v12xy" and "pos-schedulingInfoList."

FIG. 14 is a diagram illustrating an example (8) of a modification of a technical specification according to an embodiment of the present invention. As illustrated in FIG. 14, new system information "SystemInformationBlock- Type1-v12xy-IEs" may be defined as part of SIB1. By the "schedulingInfoList-v12xy" and "schedulingInfoList2-v12xy," the configured SI is scheduled.

As illustrated in FIG. 14, the "schedulingInfoList-v12xy" includes the "SchedulingInfo2-v12xy," and the "SchedulingInfo-v12xy" includes "sib-MappingInfo-v12xy."

As illustrated in FIG. 14, the "schedulingInfoList2-v12xy" includes the "SchedulingInfo2-r12," and the "SchedulingInfo2-r12" includes the "si-Periodicity-r12" and the "sib-MappingInfo-r12."

As illustrated in FIG. 14, by the "si-Periodicity-r12," one of the following can be configured as periodicity of the system information: rf8 representing 8 radio frames each having duration of 10 ms; rf16 representing 16 radio frames; rf32 representing 32 radio frames; rf64 representing 64 radio frames; rf128 representing 128 radio frames; rf256 representing 256 radio frames; and rf512 representing 512 radio frames.

As illustrated in FIG. 14, the "SIB-Type-v12xy" representing the scheduled SIB can configure SIB19, SIB20, SIB21, SIB24, SIB25, SIB26, SIB27, SIB28, SIB29, and the like, as the system information.

FIG. 15 is a diagram illustrating an example (9) of a modification of a technical specification according to an embodiment of the present invention. As illustrated in FIG. 15, the number of entries of the "schedulingInfoList-v12xy" may be the same as the number of entries of the "schedulingInfoList." The first entry of the "schedulingInfoList-v12xy" corresponds to the first entry of the "schedulingInfoList." The second entry of the "schedulingInfoList-v12xy" corresponds to the second entry of the "schedulingInfoList." Namely, the entries set to the "schedulingInfoList-v12xy" correspond to the entries set to the "schedulingInfoList" in the order of the entries.

As illustrated in FIG. 15, the "schedulingInfoList2-v12xy" indicates additional scheduling information for the SI message. In this example, the suit of the number of entries of the "schedulingInfoList2-v12xy" and the number of entries of the "schedulingInfoList" is not exceed the maximum number of SI messages.

As illustrated in FIG. 15, in this example, the "sib-MappingInfo-v12xy" and the "sib-MappingInfo-r12" are not to configure the same SIB.

FIG. 16 is a flowchart for illustrating an example (4) of system information acquisition according to an embodiment of the present invention. At step S41, the terminal 20 starts the process of determining the start position of the SI window for receiving the SI message to be acquired. At subsequent step S42, the terminal 20 determines whether the "schedulingInfoList2" is included in the "SystemInformationBlockType1." If included (YES at S42), the process proceeds to step S43. If not included (NO at S42), the process proceeds to step S44.

At step S43, the terminal 20 determines the number n corresponding to the entry position of the SI message to be acquired in the list of SI messages concatenated in the order of "schedulingInfoList," "schedulingInfoList2," and the "pos-schedulingInfoList."

At step S44, the terminal 20 determines the number n corresponding to the entry position of the SI message to be acquired in the list of SI messages concatenated in the order of "schedulingInfoList" and the "pos-schedulingInfoList."

At subsequent step S45, the terminal 20 determines a value x as $(n-1) \times w$, where w is si-windowLength representing the length of the SI window. For example, si-WindowLength may be set to 1 ms, 2 ms, 5 ms, 10 ms, 15 ms, 20 ms, or 40 ms.

At subsequent step S46, the terminal 20 sets the start position of the SI window to the subframe #a, where a=x mod 10 in a radio frame with SFN mod T=FLOOR (x/10) and T is si-Periodicity representing the periodicity of the SI. For example, by using the s-Periodicity, the periodicity of the system information can be set to one of the following: rf8 representing 8 radio frames each having the duration of 10 ms; rf16 representing 16 radio frames; rf32 representing 32 radio frames; rf64 representing 64 radio frames; rf128 representing 128 radio frames; rf256 representing 256 radio frames; and rf512 representing 512 radio frames.

Prior to executing step S42, the process may proceed to step S43 only if the "si-posOffset" is absent. If the "si-posOffset" is present, system information is scheduled by the "pos-schedulingInfoList" with an offset of 8 radio frames from the system information scheduled by the "schedulingInfoList2." Note that the "pos-schedulingInfo-List" is the system information related to the location information, and the "pos-schedulingInfoList" includes assistance data and the like for the GNSS.

FIG. 17 is a diagram illustrating an example (10) of a modification of a technical specification according to an embodiment of the present invention. FIG. 17 is an example of a modified technical specification corresponding to the flowchart of FIG. 16. As illustrate in FIG. 16, the terminal 20 may determine the number n corresponding to the entry position of the SI message to be acquired in the list of SI messages concatenated in the order of the "schedulingInfo-List," the"schedulingInfoList2," and the "pos-schedulingIn-foList."

According to the embodiments described above, even if the system information is extended, the terminal 20 can ensure that the scheduled system information is acquired.

Namely, the extended system information can be scheduled.

(Device Configurations)

Next, examples of functional configurations of the base station 10 and the terminal 20 for executing the above-described processing and operation are described. The base station 10 and the terminal 20 include functions for executing the above-described embodiments. However, each of the base station 10 and the terminal 20 may be provided with only a part of the functions in the embodiments.

<Base Station 10>

Figure 18:
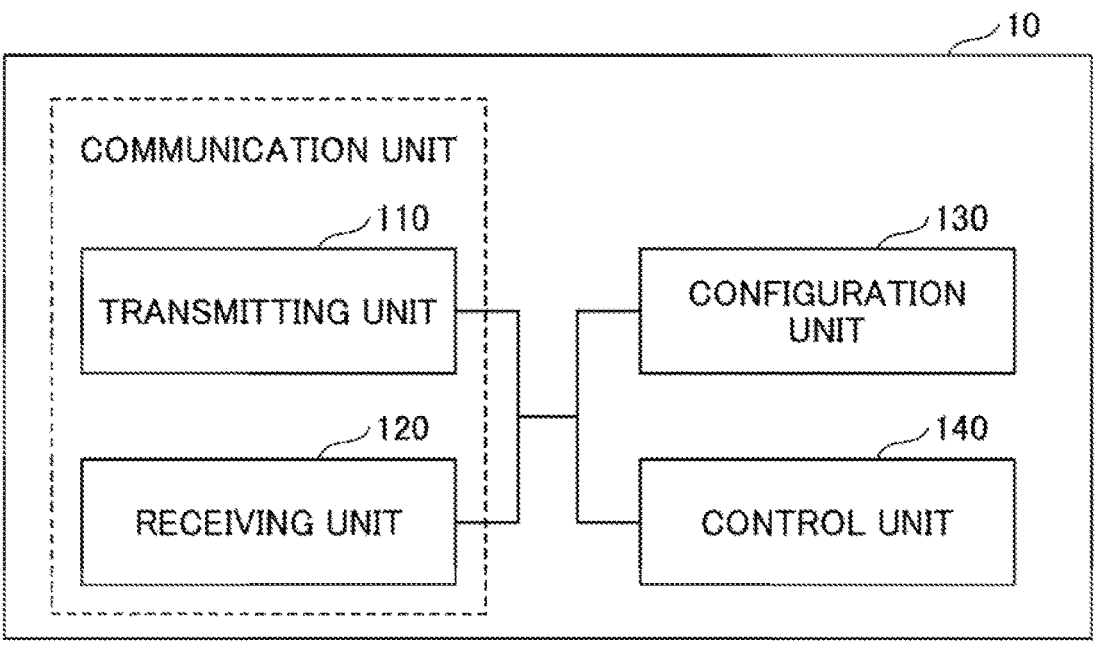
FIG. 18 is a diagram illustrating an example of a functional configuration of a base station 10 according to an embodiment of the present invention.

FIG. 18 is a diagram illustrating an example of a functional configuration of the base station 10 in an embodiment of the present invention. As illustrated in FIG. 18, the base station 10 is provided with a transmitting unit 110; a receiving unit 120; a configuration unit 130; and a control unit 140. The functional configuration illustrated in FIG. 18 is merely an example. Functional division and names of functional units may be any division and names, provided that operation according to the embodiments of the present invention can be executed.

The transmitting unit 110 is provided with a function for generating a signal to be transmitted to the terminal 20 and transmitting the signal through radio. The transmitting unit 110 transmits an inter network node, message to another network node. The receiving unit 120 includes a function for wirelessly receiving various signals transmitted from the terminal 20 and retrieving, for example, information of a higher layer from the received signals. The transmitting unit 110 is provided with a function to transmit NR-PSS, NR-SSS, NR-PBCH, DL/UL control signals, reference signals, and the like, to the terminal 20. The receiving unit 120 receives an inter network node message from another network node. The transmitting unit 110 and the receiving unit 120 may be combined to form a communication unit.

The configuration unit 130 stores, in a storage device, preconfigured configuration information and various types of configuration information to be transmitted to the terminal 20, and reads out the information from the storage device, if necessary. The content of the configuration information may be, for example, system information and the like.

As described in the embodiments, the control unit 140 performs a control related to broadcast of system information. Furthermore, the control unit 140 performs a control related to a random access. The functional unit related to signal transmission in the control unit 140 may be included in the transmitting unit 110, and the functional unit related to signal reception in the control unit 140 may be included in the receiving unit 120.

<Terminal 20>

Figure 19:
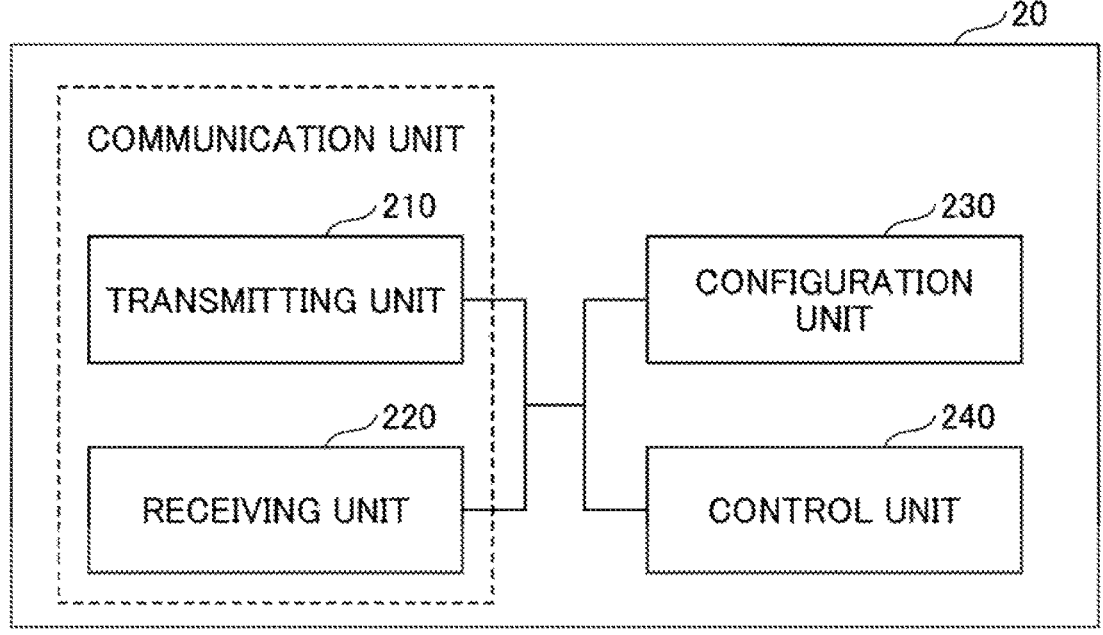
FIG. 19 is a diagram illustrating an example of a functional configuration of a terminal 20 according to an embodiment of the present invention.

FIG. 19 is a diagram illustrating an example of a functional configuration of the terminal 20 according to an embodiment of the present invention. As illustrated in FIG. 19, the terminal 20 includes a transmitting unit 210; a receiving unit 220; a configuration unit 230; and a control unit 240. The functional configuration illustrated in FIG. 19 is merely an example. The functional division and the names of the functional units may be any division and names, provided that the operation according to the embodiments of the present invention can be executed.

The transmitting unit 210 is provided with a function for creating a transmission signal from transmission data and for transmitting the transmission signal through radio. The receiving unit 220 receives various signals through radio and retrieves higher layer signals from the received physical layer signals. The receiving unit 220 is provided with a function for receiving NR-PSS, NR-SSS, NR-PBCH, DL/UL/SL control signals, and the like, transmitted from the base station 10. For example, the transmitting unit 210 transmits a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and the like to another terminal 20 as D2D communication, and the receiving unit 220 receives PSCCH, PSSCH, PSDCH, PSBCH, and the like from another terminal 20. The transmitting unit 210 and the receiving unit 220 may be combined to form a communication unit.

The configuration unit 230 stores, in a storage device, various types of configuration information received by the receiving unit 220 from the base station 10 or the terminal 20, and reads out the information from the storage device, if necessary. Furthermore, the configuration unit 230 stores preconfigured configuration information. The content of the configuration information is, for example, system information and the like.

As described in the embodiments, the control unit 240 performs a control related to acquisition of system information. Furthermore, the control unit 240 performs a control related to a random access. A functional unit related to signal transmission in the control unit 240 may be included in the transmitting unit 210, and a functional unit related to signal reception in the control unit 240 may be included in the receiving unit 220.

(Hardware Configuration)

The block diagrams (FIG. 18 and FIG. 19) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are nor limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block. (component) that functions to transmit is called a transmitting unit or a transmitter. In either case, as described above, the implementation method is not particularly limited.

Figure 20:
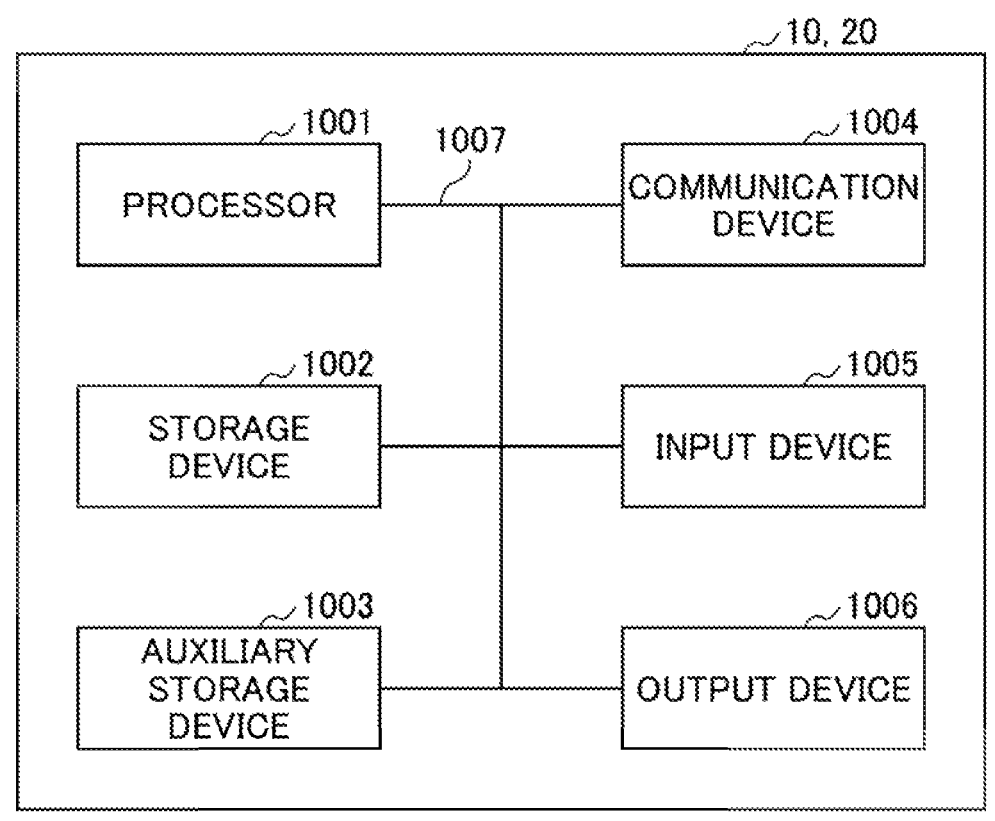
FIG. 20 is a diagram illustrating an example of a hardware configuration of the base station 10 or the terminal 20 according to an embodiment of the present invention.

For example, the base station 10, the terminal 20, or the like in an embodiment or the present disclosure may function as a computer for performing a process of the radio communication method according to the present disclosure. FIG. 20 is a diagram illustrating an example of a hardware configuration of the base station 10 and the terminal 20 according to an embodiment of the present disclosure. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, device, unit, or the like. The hardware configuration of each of the base station 10 and the terminal 20 may be configured to include one or more of each of the depicted devices, or may be configured without including some devices.

Each function in each of the base station 10 and the terminal 20 is implemented such that predetermined software (program) is read on hardware, such as the processor 1001, the storage device 1002, and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station 10 illustrated in FIG. 18 may be implemented by a control program which is stored in the storage device 1002 and operates on the processor 1001. Furthermore, for example, the control unit 240 of the terminal 20 illustrated in FIG. 19 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and may be configured with, for example, at least one of a read only memory (ROM), an erasable programmable ROM (EPROM), an electrically erasable programmable ROM (EEPROM), a random access memory (RAM), and the like. The storage device 1002 may also be referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu ray (registered trademark) disc, a smart card, a flash memory (for example, a card, a stick, or a key drive), a floppy (registered trademark) disk, a magnetic strip, and the like. The above-described recording medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as, for example, a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex(TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally formed (such as a touch panel).

The devices, such as the processor 1001 and the storage device 1002, are connected by the bus 1007 for communicating information. The bus 1007 may be configured with a single bus or may be configured with different buses between the devices.

Furthermore, each of the base station 10 and the terminal 20 may be configured to include hardware, such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

As described above, according to the embodiments of the present invention, there is provided a terminal including a receiving unit that receives first system information from a base station; and a control unit that acquires, from the first system information, a first list, a second list, and a third list, the first list scheduling second system information other than the first system information, and determines, based on the second list and the third list, a start position of a window for acquiring the second system information, wherein the receiving unit receives, from the base station, the second system information in the window.

According to the above-described configuration, even if the system information is extended, the terminal 20 can ensure that the scheduled system information is acquired. Namely, the extended scheduling information can be scheduled.

The second list may include an entry associated with the system information scheduled by using the first list and include an entry for scheduling extended system information, the third list may include an entry for scheduling system information related to location information, and the control unit may determine the start position of the window for acquiring the second system information based on a position of the second system information in a list obtained by concatenating the second list and the third list in this order. According to this configuration, even if new system information including location information is extended, the terminal 20 can ensure that the scheduled information is acquired.

The second list may include an entry for scheduling extended system information, the third list may include an entry for scheduling system information related to location information, and the control unit may determine the start position for acquiring the second system information based on a position of the second system information in a list obtained by concatenating the first list, the second list, and the third list in this order. According to this configuration, even if new system information including location information is extended, the terminal 20 can ensure that the scheduled information is acquired.

Furthermore, according to the embodiments of the present invention, there is provided a base station including a control unit that includes, in first system information, a first list, a second list, and a third list, the first list scheduling second system information other than the first system information, and determines, based on the second list and the third list, a start position of a window for transmitting the second system information; and a transmitting unit that transmits the first system information to a terminal and transmits, to the terminal, the second system information in the window.

According to the above-described configuration, even if the system information is extended, the terminal 20 can ensure that the scheduled system information is acquired. Namely, the extended scheduling information can be scheduled.

Furthermore, according to the embodiments of the present invention, there is provided a communication method in which a terminal executes a receiving procedure of receiving first system information from a base station; a control procedure of acquiring, from the first system information, a first list, a second list, and a third list, the first list scheduling second system information other than the first system information, and determining, based on the second list and the third list, a start position of a window for acquiring the second system information; and a procedure of receiving, from the base station, the second system information in the window.

According to the above-described configuration, even if the system information is extended, the terminal 20 can ensure that the scheduled system information is acquired. Namely, the extended scheduling information can be scheduled.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by, using any other method. For example, the notification of information may be provided by physical layer signalling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (ERA), new Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-Wide-Band (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information, a signal, or the like described in the present disclosure may be output from a higher layer (or a lower layer) to a lower layer (or a higher layer layer). Information, a signal, or the like described in the present disclosure may be input and output via a plurality of network nodes.

Input and output information the like may be stored in a specific place (for example, a memory) or may be managed by using a management table. Input and output information and the like may be overwritten, updated, or additionally written Output information and the like may be deleted. Input information and the like may be transmitted to another device.

The determination in the present disclosure tray be made in accordance with a value (0 or 1) indicated by one bit, may be made in accordance with a Boolean value (true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology is included in a definition of a transmission medium.

Information, signals, and the like described in the present disclosure may be expressed using any one of a variety of different techniques. For example, data, instructions, commands, information, signals, bits, symbols, chips, and the like which are mentioned throughout the above description may be expressed by voltages, currents, electromagnetic waves, magnetic fields or magnetic particles, optical fields or photons, or any combination thereof.

The terms described in the present disclosure and terms necessary for understanding the present disclosure may be replaced with terms having the same or similar meanings. For example, at least one of a channel and a symbol may be a signal (signalling). Furthermore, a signal may be a message. Furthermore, a component carrier (CC) may be referred to as a "carrier frequency," a "cell," a "frequency carrier," or the like.

The terms "system" and "network" used in the present disclosure are used interchangeably.

Furthermore, information, parameters, and the like described in the present disclosure may be expressed by using absolute values, may be expressed by using relative values from predetermined values, or may be expressed by using any other corresponding information. For example, radio resources may be those indicated by an index.

The names used for the above-described parameters are not limited names in any point of view. Furthermore, mathematical formulas or the like using the parameters may be different from those explicitly disclosed in the present disclosure. Since various channels (for example, a PUCCH, a PDCCH, and the like) and information elements can be identified by any suitable names, various names assigned to the various channels and the information elements are not limited names in any point of view.

In the present disclosure, the terms "base station (BS)," "radio base station," "base station apparatus," "fixed station," "Node B," "eNode B (e-NB)," "gNodeB (gNB)," "access point," "transmission point," "reception point," "transmission/reception point," "cell," "sector," "cell group," "carrier," "component carrier," and the like can be used interchangeably. The base station may also be referred to by a term, such as a macrocell, a small cell, a femtocell, and a picocell.

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like.

The mobile body may be a vehicle (for example, a car, an airplane, or the like), an unmanned body that moves (for example, a drone, an autonomous car or the like), or a robot (manned type or unmanned type). At least one of the base station and the mobile station includes a device that need not move during a communication operation. For example, at least one of the base station and the mobile station may be an Internet of things (IoT) device such as a sensor.

Furthermore, the base station in the present disclosure may be replaced with a user terminal. For example, each aspect/embodiment of the present disclosure may be applied to a configuration in which communication between the base station and the user terminal is replaced with communication between a plurality of terminals 20 (for example, which may be referred to as device-to-device (D2D) or vehicle-to-everything (V2X)). In this case, the terminal 20 may have the functions of the base station 10 described above. Furthermore, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station in this case, the base station may have the functions of the above-mentioned user terminal.

The terms "determination (determining)" and "decision (determining)" used in the present specification may include various types of operations. The "determination" and "decision" may include deeming "judging," "calculating," "computing," "processing," "deriving," "investigating," "looking up, search, inquiry (for example, searching in a table, a database, or another data structure)," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation, such as "first" or "second," used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Furthermore, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing. (OFDM) symbols, single carrier frequency division multiple access (SC-TDMA) symbols, or the like) in the time domain. The slot may be a time unit based on the numerology.

The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B.

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. One TTI, one subframe, or the like may be formed of one or more resource blocks.

Furthermore, one or more RBS may be referred to as a physical resource block (PRB), a sub carrier group (SCG), a resource element group (REG), a PRB pair, an RB pair, or the like.

Furthermore, the resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Furthermore, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Each aspect/embodiment described in the present disclosure may be used alone, in combination, or may be switched in accordance with the execution. Furthermore, notification of predetermined information (for example, notification of "being X") is not limited to notification performed explicitly, but may be performed implicitly. (for example, not notifying the predetermined information).

Note that, in the present disclosure, SIB1 is an example of first system information. The SI message to be acquired is an example of second system information. The "schedulingInfoList" is an example of a first list. The "schedulingInfoList-v12xy" or the "schedulingInfoList2" is an example of a second list. The pos-schedulingInfoList is an example of a third list.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

This international patent application is based on and claims priority to Japanese Patent Application No. 2020-145095 filed on Aug. 28, 2020, and the entire content of Japanese Patent Application No. 2020-145095 is incorporated herein by reference.

LIST OF REFERENCE SYMBOLS 10 base station
110 transmitting unit
120 receiving unit
130 configuration unit
140 control unit.
20 terminal
210 transmitting unit
220 receiving unit
230 configuration unit
30 core network
240 control unit
1001 processor
1002 storage device
1003 auxiliary storage device
1004 communication device
1005 input device
1006 output device

What is claimed is:
1. A terminal comprising:
a receiver that receives first system information from a base station; and
a processor that
determines, when, from among a first list, a second list, and a third list to schedule second system informa- tion other than the first system information, the second list is included in the first system information, a start position of a window to acquire the second system information based on an order of entry of a list obtained by concatenating the first list, the second list, and the third list, and that determines, when the second list is not included in the first system information, the start position of the window to acquire the second system information based on a list obtained by concatenating the first list and the third list, wherein the receiver receives, from the base station, the second system information in the window, and wherein the first list is formed of one or more entries to schedule system information being System Information Block (SIB) of SIB3 to SIB18, the second list is formed of one or more entries to schedule extended system information being SIB19 and onward, and the third list is formed of one or more entries to schedule system information related to location information.

2. A base station comprising:

a processor that configures first system information including a first list, a second list, and a third list to schedule second system information other than the first system information, the first system information notifying a start position of a window for a terminal to acquire the second system information based on an order of entry of a list obtained by concatenating the first list, the second list, and the third list, or configures the first system information including the first list and the third list to schedule the second system information other than the first system information, the first system information notifying the start position of the window for the terminal to acquire the second system information based on a list obtained by concatenating the first list and the third list; and a transmitter that transmits the first system information to the terminal, wherein the transmitter transmits the second system information to the terminal, and wherein the first list is formed of one or more entries to schedule system information being System Information Block (SIB) of SIB3 to SIB18, the second list is formed of one or more entries to schedule extended system information being SIB19 and onward, and the third list is formed of one or more entries to schedule system information related to location information.

3. A radio communication system comprising:

a base station; and a terminal, wherein the base station includes:

a processor that configures first system information including a first list, a second list, and a third list to schedule second system information other than the first system information, the first system information notifying a start position of a window for a terminal to acquire the second system information based on an order of entry of a list obtained by concatenating the first list, the second list, and the third list, or configures the first system information including the first list and the third list to schedule the second system information other than the first system information, the first system information notifying the start position of the window for the terminal to acquire the second system information based on a list obtained by concatenating the first list and the third list; and a transmitter that transmits the first system information to the terminal, wherein the transmitter transmits the second system information to the terminal, and wherein the terminal includes:

a receiver that receives first system information from the base station; and a processor that determines, when, from among the first list, the second list, and the third list to schedule the second system information other than the first system information, the second list is included in the first system information, the start position of the window to acquire the second system information based on the order of entry of the list obtained by concatenating the first list, the second list, and the third list, and that determines, when the second list is not included in the first system information, the start position of the window to acquire the second system information based on a list obtained by concatenating the first list and the third list, wherein the receiver receives, from the base station, the second system information in the window, and wherein the first list is formed of one or more entries to schedule system information being System Information Block (SIB) of SIB3 to SIB18, the second list is formed of one or more entries to schedule extended system information being SIB19 and onward, and the third list is formed of one or more entries to schedule system information related to location information.

4. A communication method executed by a terminal, the method comprising:

receiving first system information from a base station; and determining, when, from among a first list, a second list, and a third list to schedule second system information other than the first system information, the second list is included in the first system information, a start position of a window to acquire the second system information based on an order of entry of a list obtained by concatenating the first list, the second list, and the third list, and determining, when the second list is not included in the first system information, the start position of the window to acquire the second system information based on a list obtained by concatenating the first list and the third list, wherein the receiving receives, from the base station, the second system information in the window, and wherein the first list is formed of one or more entries to schedule system information being System Information Block (SIB) of SIB3 to SIB18, the second list is formed of one or more entries to schedule extended system information being SIB19 and onward, and the third list is formed of one or more entries to schedule system information related to location information.

* * * * *